(12) United States Patent
Miyazaki et al.

(10) Patent No.: US 10,985,387 B2
(45) Date of Patent: Apr. 20, 2021

(54) FUEL CELL SYSTEM AND FUEL CELL SYSTEM WARM-UP METHOD

(71) Applicant: NISSAN MOTOR CO., LTD., Yokohama (JP)

(72) Inventors: Shinichi Miyazaki, Kanagawa (JP); Hayato Chikugo, Kanagawa (JP); Masashi Sato, Kanagawa (JP); Tatsuya Yaguchi, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/638,836

(22) PCT Filed: Aug. 14, 2017

(86) PCT No.: PCT/JP2017/029314
§ 371 (c)(1),
(2) Date: Feb. 13, 2020

(87) PCT Pub. No.: WO2019/035168
PCT Pub. Date: Feb. 21, 2019

(65) Prior Publication Data
US 2020/0388862 A1    Dec. 10, 2020

(51) Int. Cl.
*H01M 8/04014* (2016.01)
*H01M 8/04701* (2016.01)
*H01M 8/04746* (2016.01)

(52) U.S. Cl.
CPC ... *H01M 8/04022* (2013.01); *H01M 8/04708* (2013.01); *H01M 8/04753* (2013.01)

(58) Field of Classification Search
None
See application file for complete search history.

(56) References Cited

U.S. PATENT DOCUMENTS 6,374,166 B1 *  4/2002  Takeda ............... H01M 8/0612
                                                              701/22
2002/0182465 A1  12/2002  Okamoto
(Continued)

FOREIGN PATENT DOCUMENTS

JP    11-176458 A       7/1999
JP    2002-343385 A    11/2002
(Continued)

*Primary Examiner* — Wojciech Haske
(74) *Attorney, Agent, or Firm* — Foley & Lardner LLP

(57) ABSTRACT

A fuel cell system comprises a fuel cell supplied with fuel and air to generate electricity, an evaporator evaporating the fuel, an off-gas heating device heating an off-gas discharged from the fuel cell to produce a heating gas, a fuel cell heating device heating the fuel cell using the heating gas, an evaporator heating device heating the evaporator using the heating gas, a fuel cell temperature acquisition unit, an evaporator temperature acquisition unit, and a controller configured to, in a warm-up operation to perform a warm-up of the evaporator and a warm-up of the fuel cell, control at least one of the evaporator heating device and the fuel cell heating device based on the temperature of the evaporator and the temperature of the fuel cell to adjust at least one of a heating amount of the evaporator and a heating amount of the air by the heating gas.

18 Claims, 13 Drawing Sheets

(56) References Cited

U.S. PATENT DOCUMENTS

| | | |
|---|---|---|
| 2004/0224196 A1 | 11/2004 | Pastula et al. |
| 2014/0038071 A1* | 2/2014 | Ogawa .............. H01M 8/04373 429/425 |
| 2018/0358640 A1 | 12/2018 | Shiomi |
| 2018/0366749 A1 | 12/2018 | Maeshima |
| 2018/0375127 A1 | 12/2018 | Yamazaki et al. |

FOREIGN PATENT DOCUMENTS

| | | |
|---|---|---|
| JP | 2006-525631 A | 11/2006 |
| JP | 2014-165135 A | 9/2014 |
| JP | 2016-154067 A | 8/2016 |
| WO | WO 2017/104255 A1 | 6/2017 |
| WO | WO 2017/104301 A1 | 6/2017 |
| WO | WO 2017/110513 A1 | 6/2017 |

\* cited by examiner

FUEL CELL SYSTEM AND FUEL CELL SYSTEM WARM-UP METHOD

TECHNICAL FIELD

The present invention relates to a fuel cell system and a method for warming up the fuel cell system.

BACKGROUND ART

JP2016-154067A discloses a fuel cell system including a start-up combustor for warming up a fuel cell stack and an evaporator, and a reformer. The system is configured to switch a supply destination of raw fuel between the start-up combustor and the reformer when starting the system.

In the fuel cell system of JP2016-154067A, until the reformer reaches a reforming possible temperature (until the warm-up of the reformer is finished), the components other than the reformer are heated by the start-up combustor to promote the warm-up of those components, and after the warm-up of the reformer is completed, the raw fuel is supplied to the reformer so that the reforming process is performed.

SUMMARY OF INVENTION

In JP2016-154067A, since the start-up combustor is operated even before the warm-up of the reformer, the warm-up of the fuel cell stack and the warm-up of the evaporator progress. However, no consideration is paid to the balance between the warm-up progress of the fuel cell stack and the warm-up progress of the evaporator. Therefore, for example, the warm-up of the fuel cell may progress even though the warm-up of the evaporator is not complete. As a result of the difference in the warm-up progress between them, oxidative degradation of an anode catalyst or an adverse effect on the heat resistance of the same may occur.

It is therefore an object of the present invention to provide a fuel cell system and a method for warming up the fuel cell system, that can solve the above-described problem.

According to an aspect of the present invention, a fuel cell system comprises a fuel cell configured to be supplied with fuel and air to generate electricity, an evaporator configured to evaporate the fuel to be supplied to the fuel cell, an off-gas heating device configured to heat an off-gas discharged from the fuel cell to produce a heating gas, a fuel cell heating device configured to heat the air to be supplied to the fuel cell using the heating gas, an evaporator heating device configured to heat the evaporator by the heating gas, a fuel cell temperature acquisition unit configured to acquire a temperature of the fuel cell, an evaporator temperature acquisition unit configured to acquire a temperature of the evaporator, and a controller.

The controller is configured to, in a warm-up operation to perform a warm-up of the evaporator and a warm-up of the fuel cell, control at least one of the evaporator heating device and the fuel cell heating device based on the temperature of the evaporator and the temperature of the fuel cell to adjust at least one of a heating amount of the evaporator and a heating amount of the air by the heating gas.

The details as well as other features and advantages of the present invention are set forth in the remainder of the specification and are shown in the accompanying drawings.

DESCRIPTION OF EMBODIMENTS

Hereinafter, embodiments of the present invention will be described with reference to the drawings.

First Embodiment

Figure 1:
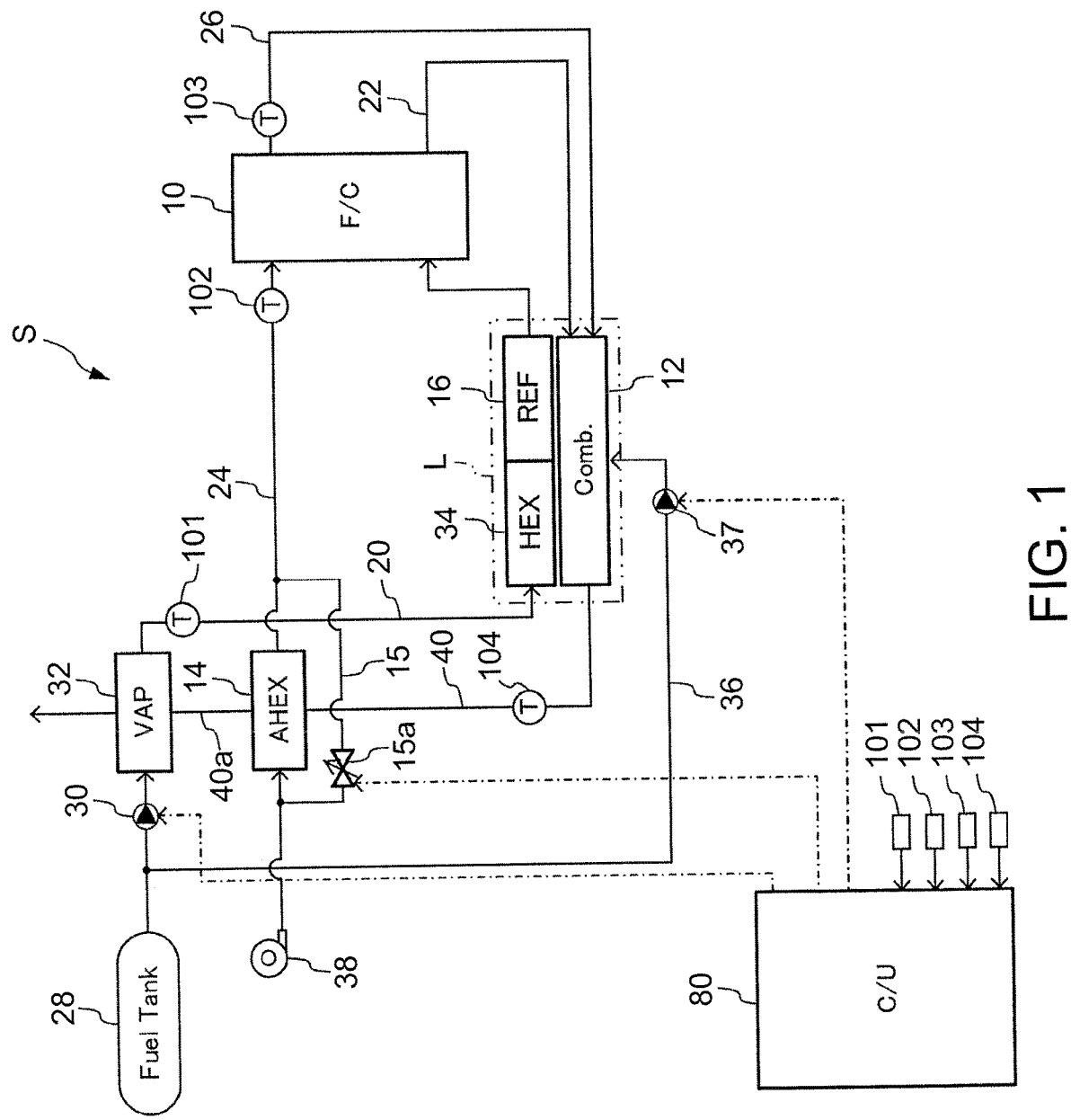
FIG. 1 is a schematic diagram explaining the configuration of a fuel cell system according to the present invention

FIG. 1 illustrates the configuration of a fuel cell system S according to a first embodiment of the present invention.

As illustrated, the fuel cell system S according to this embodiment is installed in a vehicle or the like and includes a fuel cell stack 10, a discharged gas combustor 12 forming an off-gas heating device, an air heat exchanger 14 forming a fuel cell heating device, a bypass passage 15, and a bypass valve 15a, a reformer 16, and a controller 80.

The fuel cell stack 10 is formed by stacking a plurality of fuel cells or fuel-cell unit cells. Each of the fuel cells serves as a power generation source and is constituted by, for example, a solid oxide fuel cell (SOFF).

In an anode system of the fuel cell stack 10 comprises a main fuel supply passage 20 for supplying fuel (e.g. hydrogen) as a reductant gas to an anode electrode of the fuel cell stack 10, and an anode off-gas passage 22 for the flow of anode off-gas discharged from the anode electrode after power generation reaction.

In a cathode system of the fuel cell stack 10 comprises a main air supply passage 24 for supplying air as an oxidant gas to a cathode electrode of the fuel cell stack 10, and a cathode off-gas passage 26 for the flow of cathode off-gas discharged from the cathode electrode after power generation reaction. That is, the anode off-gas and the cathode off-gas of this embodiment correspond to an off-gas discharged from the fuel cell stack 10.

The main fuel supply passage 20 is provided with a raw fuel tank 28, a first injector 30, an evaporator 32, an evaporator temperature sensor 101, a reformer heat exchanger 34, and the reformer 16 in this order from upstream.

A combustor fuel supply passage 36 that branches from the main fuel supply passage 20 between the raw fuel tank 28 and the first injector 30 is connected to the discharged gas combustor 12. The combustor fuel supply passage 36 is provided with a second injector 37.

The raw fuel tank 28 stores, as raw fuel before reforming, liquid fuel composed of a mixture of oxygenated fuel (e.g. ethanol) and water. The liquid fuel stored in the raw fuel tank 28 is supplied respectively to the evaporator 32 by the first injector 30 of the main fuel supply passage 20 and to the discharged gas combustor 12 by the second injector 37 of the combustor fuel supply passage 36. The injection amounts of these injectors are adjusted to the predetermine injection amounts.

According to this embodiment, the first injector 30 is configured to be adjustable in opening degree so as to adjust the flow rate of fuel gas to be supplied to the fuel cell stack 10. The fuel gas is produced through evaporation by the evaporator 32 and reforming by the reformer 16.

Further, the second injector 37 is configured to be adjustable in opening degree so as to adjust the amount of liquid fuel to be supplied to the discharged gas combustor 12. Therefore, according to this embodiment, the fuel supply amount to the discharged gas combustor 12 (hereinafter also referred to as a "fuel injection amount Fcomb") corresponding to the calorific value of a combustion gas produced in the discharged gas combustor 12, which will be described later, can be adjusted by controlling the opening degree of the second injector 37.

The evaporator 32 heats the liquid fuel supplied from the raw fuel tank 28 through the first injector 30 to produce an unreformed fuel gas composed of ethanol gas and water vapor.

The evaporator temperature sensor 101 detects the temperature of the fuel gas, evaporated by the evaporator 32, before being supplied to the reformer heat exchanger 34. According to this embodiment, the temperature of this fuel gas is regarded as the temperature of the evaporator 32. That is, the evaporator temperature sensor 101 functions as an evaporator temperature acquisition unit that detects the temperature of the fuel gas before being supplied to the reformer heat exchanger 34 as an "evaporator temperature Tv".

The reformer heat exchanger 34 performs the heat exchange between the combustion gas from the discharged gas combustor 12 and the unreformed fuel gas, thereby heating the unreformed fuel gas.

The reformer 16 reforms the unreformed fuel gas into a stable state gas for supply to the fuel cell stack 10. For example, the reformer 16 performs steam reforming of the unreformed fuel gas using a reforming catalyst, not shown, thereby producing a fuel gas composed mainly of hydrogen.

The anode off-gas passage 22 connects an anode outlet of the fuel cell stack 10 to the discharged gas combustor 12. Consequently, as described above, an anode off-gas discharged from the anode electrode after power generation reaction is supplied to the discharged gas combustor 12 through the anode off-gas passage 22.

An air pump 38 that pumps air into the main air supply passage 24 is provided at an inlet of the main air supply passage 24. The main air supply passage 24 is provided with the bypass passage 15 together with the air heat exchanger 14, and a stack air electrode inlet temperature sensor 102 in this order from upstream and connected to an air electrode inlet of the fuel cell stack 10 at its other end.

The bypass passage 15 is provided to connect a position upstream of the air heat exchanger 14 and a position downstream of the air heat exchanger 14 in the main air supply passage 24 to each other. Therefore, part of the air from the air pump 38 can be supplied to the fuel cell stack 10 through the bypass passage 15, bypassing the air heat exchanger 14.

The bypass passage 15 is provided with the bypass valve 15a. The bypass valve 15a is configured such that the opening degree (hereinafter also referred to as a "bypass valve opening degree Oby") can be adjusted continuously or stepwise. Therefore, by adjusting the bypass valve opening degree Oby of the bypass valve 15a, the flow rate of air that flows in the bypass passage 15, i.e. the air flow rate that bypasses the air heat exchanger 14 (hereinafter also referred to as a "bypass air flow rate qby"), can be adjusted. As a result, it is possible to adjust the air flow rate that passes through the air heat exchanger 14 (hereinafter also referred to as a "heat exchanger passing air flow rate qex").

The air heat exchanger 14 is a device that heats at least part of air supplied from the air pump 38 by performing the heat exchange with a combustion gas produced in the discharged gas combustor 12, which will be described later. The air heated by the air heat exchanger 14 in this way is supplied to the fuel cell stack 10. Hereinafter, the flow rate of air that is supplied to the fuel cell stack 10 will also be referred to as a "stack supply air flow rate qst".

The stack air electrode inlet temperature sensor 102 is provided in the main air supply passage 24 near the inlet of the cathode electrode of the fuel cell stack 10 and detects the temperature of air to be supplied to the cathode electrode of the fuel cell stack 10. That is, the temperature of air detected by the stack air electrode inlet temperature sensor 102 is a detected value of the temperature of air near the cathode electrode inlet of the fuel cell stack 10, which is a mixture of air heated by the air heat exchanger 14 and air supplied through the bypass passage 15. According to this embodiment, the temperature of air detected by the stack air electrode inlet temperature sensor 102 is regarded as the temperature of the fuel cell (hereinafter also referred to as a "stack temperature Ts").

On the other hand, the cathode off-gas passage 26 connects a cathode outlet of the fuel cell stack 10 to the discharged gas combustor 12. Consequently, as described above, a cathode off-gas discharged from the cathode electrode after power generation reaction is supplied to the discharged gas combustor 12 through the cathode off-gas passage 26.

The cathode off-gas passage 26 is provided with a stack air electrode outlet temperature sensor 103 near the inlet of the cathode electrode of the fuel cell stack 10. The stack air electrode outlet temperature sensor 103 detects a "stack outlet temperature Ts_out" which is the temperature of a cathode off-gas discharged from the cathode electrode of the fuel cell stack 10.

The discharged gas combustor 12 is supplied with liquid fuel from the raw fuel tank 28 through the second injector 37 of the combustor fuel supply passage 36 and supplied with an anode off-gas and an air electrode off-gas from the fuel cell stack 10 through the anode off-gas passage 22 and the cathode off-gas passage 26.

The discharged gas combustor 12 produces a combustion gas (heating gas) by catalytic combustion of a mixture of these liquid fuel, anode off-gas, and cathode off-gas using a combustion catalyst, not shown. When the calorific value required for a combustion gas to be produced is low, the discharged gas combustor 12 is capable of producing a combustion gas by catalytic combustion of a mixture of an anode off-gas and an air electrode off-gas without being supplied with liquid fuel from the raw fuel tank 28.

Further, a combustion gas passage 40 is connected to the discharged gas combustor 12 on the downstream side. The combustion gas passage 40 is provided with a fuel gas passage temperature sensor 104, the air heat exchanger 14, and the evaporator 32 in this order from upstream and communicates with the outside air at its other end. According to this embodiment, the combustion gas passage 40 supplies a combustion gas produced in the discharged gas combustor 12 to the air heat exchanger 14 and the evaporator 32.

The fuel gas passage temperature sensor 104 detects the temperature of the combustion gas produced in the discharged gas combustor 12 and flowing in the combustion gas passage 40. Hereinafter, a detected value of the temperature of this combustion gas will also be referred to as a "discharged gas combustor temperature Tcomb".

According to this embodiment, it is configured that the reformer heat exchanger 34 and the reformer 16 are housed in a case (indicated by a two-dot chain line) together with the discharged gas combustor 12 so that the calorific value of the combustion gas is transferred to the reformer heat exchanger 34 and the reformer 16 inside the shared case L.

In the fuel cell system S having the configuration described above, when the bypass valve opening degree Oby of the bypass valve 15a in the bypass passage 15 is increased to increase the bypass air flow rate qby, the heat exchanger passing air flow rate qex is reduced. Therefore, while an air amount that is heat-exchanged with a combustion gas in the air heat exchanger 14 is relatively reduced, an air amount that passes through the bypass passage 15 and thus is not heated is relatively increased.

Consequently, the calorific value of the air as a result of joining of them, which is supplied to the fuel cell stack 10, is reduced. That is, the heating rate of the fuel cell stack 10 by this air is reduced. On the other hand, when the heat exchanger passing air flow rate qex is reduced as described above, the calorific value of the combustion gas in the combustion gas passage 40 that is lost by the heat exchange with the air is reduced. That is, the calorific value of the discharged gas that is supplied to the evaporator 32 through the combustion gas passage 40 is increased. Consequently, the heating rate of the evaporator 32 by this discharged gas is increased.

In terms of the combustion gas in the combustion gas passage 40, the calorific value that is lost by the heat exchange with the air in the air heat exchanger 14 is reduced. Therefore, since the calorific value of the combustion gas that is supplied to the evaporator 32 after the heat exchange in the air heat exchanger 14 is relatively increased, the heating rate of the evaporator 32 is improved. Further, conversely, when the bypass valve opening degree Oby of the bypass valve 15a in the bypass passage 15 is reduced to reduce the bypass air flow rate qby, the heating rate of the fuel cell stack 10 is improved, while the heating rate of the evaporator 32 is reduced. Therefore, the balance between the heating rate of the fuel cell stack 10 and the heating rate of the evaporator 32 can also be adjusted by adjusting the bypass valve opening degree Oby of the bypass valve 15a.

According to this embodiment, the bypass valve 15a is configured to provide the bypass air flow rate qby that prevents the evaporator temperature Tv from exceeding a predetermined upper limit temperature, even when the bypass valve 15a is in a fully open state (even when the bypass valve opening degree Oby is maximum). In other words, the heat exchanger passing air flow rate qex is maintained at a certain value or more so as to make the evaporator temperature Tv equal to or less than the upper limit temperature, even when the bypass valve 15a is fully opened. Since the evaporator temperature Tv is limited so as not to exceed the predetermined upper limit temperature in this way, the calorific value of an after-stack-heating combustion gas that is supplied to the evaporator 32 after the heat exchange in the air heat exchanger 14 is limited. As a result, the temperature of the after-stack-heating combustion gas when it is discharged to the outside after heating the evaporator 32 can be limited to a certain value or less.

The controller 80 is constituted by a computer, particularly a microcomputer, including a central processing unit (CPU), a read only memory (ROM), a random access memory (RAM), and an input/output interface (I/O interface). The controller 80 is programmed to execute at least processes necessary for performing processes according to any of this embodiment including a later-described variant 1 or 2, a second embodiment, and a third embodiment of the present invention.

The controller 80 may be constituted by a single microcomputer. The controller 80 may also be constituted by a plurality of microcomputers so as to perform distributed processing of respective controls of this embodiment by the plurality of microcomputers.

The controller 80 controls the operations of various devices and components that are required for operating the fuel cell system S. In particular, the controller 80 of this embodiment receives at least signals of detected values of the evaporator temperature sensor 101 and the stack air electrode inlet temperature sensor 102, and preferably, further, signals of detected values of the stack air electrode outlet temperature sensor 103 and the fuel gas passage temperature sensor 104, and controls the bypass valve 15a, the second injector 37, and so on based on these signals.

According to this embodiment, for example, in response to receipt of a start request signal for the fuel cell system S that is produced by a predetermined operation of a SOFC start switch or the like, the controller 80 performs a warm-up operation (warm-up control) in which the warm-up of the fuel cell stack 10 and the warm-up of the evaporator 32 are performed in parallel.

Herein, the warm-up of the fuel cell stack 10 refers to a process that increases the temperature of (heats) the fuel cell stack 10, which is in a low temperature state (e.g. a normal temperature state) during suspension of operation or the like, to a warm-up target temperature (hereinafter also referred to as a "stack warm-up target temperature Ts_t") that is, for example, equal to or higher than 500° C. In particular, the stack warm-up target temperature Ts_t is set to a temperature around an oxidative degradation point To_deg (e.g. a predetermined temperature between 400° C. and 500° C.) that is a temperature at which oxidative degradation of an anode catalyst (mainly nickel) of the fuel cell stack 10 occurs, and preferably to a temperature exceeding the oxidative degradation point To_deg.

The warm-up of the evaporator 32 refers to a process that increases the temperature of (heats) the evaporator 32, which is in a low temperature state during suspension of operation or the like, to a warm-up target temperature (hereinafter also referred to as an "evaporator warm-up target temperature Tv_t") that is, for example, about several hundred degrees centigrade at which the evaporation of raw fuel described above is enabled. In particular, the evaporator warm-up target temperature Tv_t is set equal to or higher than a temperature (an evaporator operation lower limit temperature) at which the evaporation by the evaporator 32 can be achieved to a degree that can suppress supply of fuel in a liquid state to the reformer 16.

In the above-described warm-up operation, based on the stack temperature Ts and the evaporator temperature Tv, the controller 80 controls the second injector 37 to adjust the fuel injection amount Fcomb which is a fuel supply amount to the discharged gas combustor 12.

Further, in the above-described warm-up operation, based on the stack temperature Ts and the evaporator temperature Tv, the controller 80 controls the bypass valve 15a (the bypass valve opening degree Oby) to adjust the bypass air flow rate qby (the heat exchanger passing air flow rate qex).

Next, the background to perform the control by the controller 80 according to this embodiment will be described.

Figure 13:
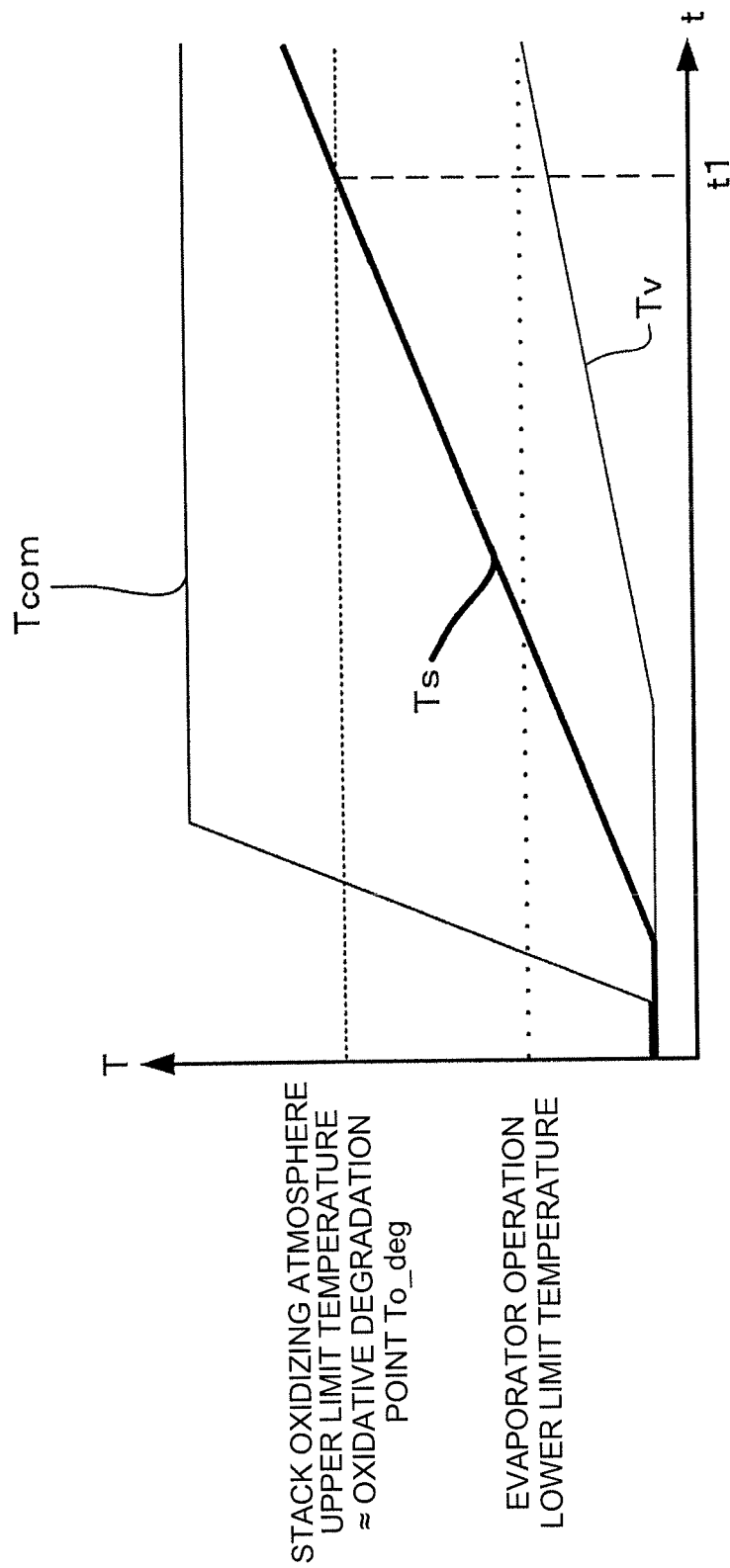
FIG. 13 is a diagram explaining a background art.

FIG. 13 is a graph illustrating the outline of temporal change in temperatures in a warm-up operation according to a background art.

As illustrated, when the warm-up operation has started, as the calorific value of a combustion gas produced in the discharged gas combustor 12 (the discharged gas combustor temperature Tcomb) increases, the warm-up of the fuel cell stack 10 and the warm-up of the evaporator 32 progress by the heat of the combustion gas. That is, the stack temperature Ts and the evaporator temperature Tv are respectively increased.

However, due to various factors, when the progress of the warm-up of the fuel cell stack 10 is faster than the progress of the warm-up of the evaporator 32 as illustrated, the stack temperature Ts may reach an oxidizing atmosphere upper limit temperature (e.g. the oxidative degradation point To_deg) earlier and cause catalyst degradation (time t1 in the figure).

In this case, in order to suppress oxidative degradation of the anode catalyst of the fuel cell stack 10, it is preferable to start supplying a fuel gas to the fuel cell stack 10 to make the inside of the anode electrode a reducing atmosphere. However, as illustrated, the progress of the warm-up of the evaporator 32 is relatively delayed so that the evaporator temperature Tv has not reached the evaporator operation lower limit temperature, and therefore, the evaporation of raw fuel by the evaporator 32 cannot be performed sufficiently. That is, even when the supply of the raw fuel to the evaporator 32 is started in this state, it is conceivable that the evaporation of the fuel is insufficient to disable reforming by the reformer 16, resulting in a state where it is not possible to supply the fuel gas to the fuel cell stack 10. Therefore, there is a possibility that the above-described oxidizing atmosphere cannot be eliminated so that the oxidative degradation of the anode catalyst progresses.

In particular, in the case of the warm-up operation in the fuel cell system S having the system configuration illustrated in FIG. 1, a combustion gas produced by the discharged gas combustor 12 warms up the evaporator 32 in the form of an after-fuel-cell-heating gas after being used for the heat exchange in the air heat exchanger 14 with air inside the main air supply passage 24 (i.e. for heating the fuel cell stack 10). Therefore, the heating rate of the evaporator 32 in the warm-up operation becomes low compared to the heating rate of the fuel cell stack 10. Therefore, the progress of the warm-up of the evaporator 32 tends to be more delayed compared to the progress of the warm-up of the fuel cell stack 10, and therefore, the above-described problem that the oxidizing atmosphere cannot be eliminated is more conspicuous.

In the fuel cell system S according to this embodiment, the warm-up operation by the controller 80 described below is performed to solve such a problem.

Figure 2:
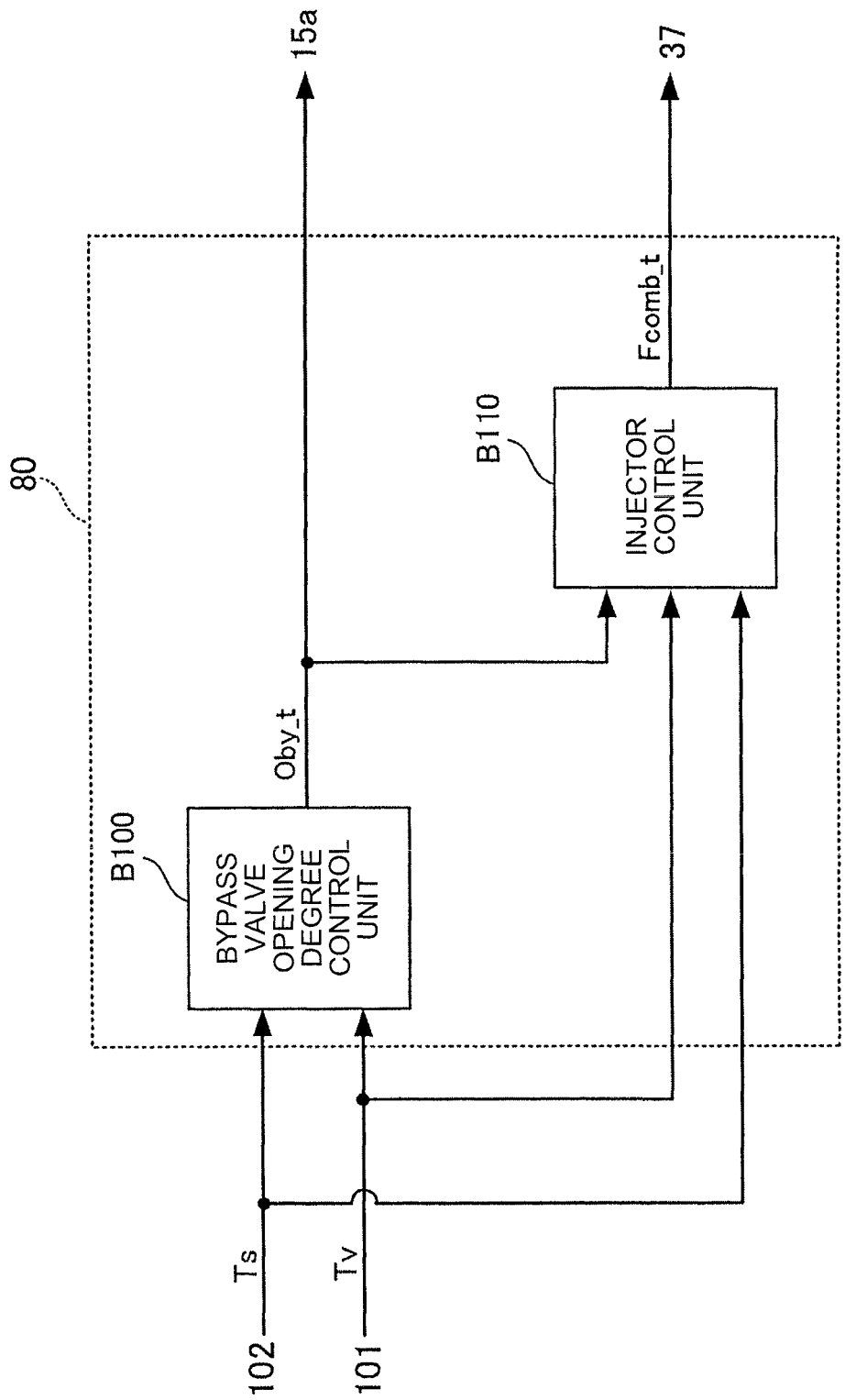
FIG. 2 is a block diagram explaining a warm-up operation of the fuel cell system according to a first embodiment of the present invention.

FIG. 2 is a block diagram explaining the warm-up operation of the fuel cell system S according to this embodiment. The functions of calculation units illustrated in this block diagram are realized by the hardware and software (programs) constituting the controller 80.

As illustrated, the controller 80 of this embodiment includes a bypass valve opening degree control unit B100 and an injector control unit B110.

The evaporator temperature Tv detected by the evaporator temperature sensor 101 and the stack temperature Ts detected by the stack air electrode inlet temperature sensor 102 are input to the bypass valve opening degree control unit B100.

The bypass valve opening degree control unit B100 adjusts the bypass valve opening degree Oby of the bypass valve 15a based on the evaporator temperature Tv and the stack temperature Ts.

Specifically, the bypass valve opening degree control unit B100 calculates a target bypass valve opening degree Oby_t being a target opening degree of the bypass valve 15a so that the evaporator temperature Tv and the stack temperature Ts respectively become desired values, and operates the bypass valve 15a so that the bypass valve opening degree Oby approaches the target bypass valve opening degree Oby_t.

In particular, according to this embodiment, the bypass valve opening degree control unit B100 calculates the target bypass valve opening degree Oby_t based on the warm-up degree of the fuel cell stack 10 and the warm-up degree of the evaporator 32.

Herein, the warm-up degree of the fuel cell stack 10 is an index (parameter) indicating to what degree the warm-up of the fuel cell stack 10 has progressed relative to the completion of this warm-up. Therefore, the warm-up degree of the fuel cell stack 10 can be calculated in terms of to what degree the current stack temperature Ts approaches the temperature (the stack warm-up target temperature Ts_t) at which the warm-up of the fuel cell stack 10 should be finished.

For example, the bypass valve opening degree control unit B100 calculates, as the warm-up degree of the fuel cell stack 10, a ratio of the stack temperature Ts to the stack warm-up target temperature Ts_t. For example, the ratio of the stack temperature Ts to the stack warm-up target temperature Ts_t can be calculated as the deviation between them or the quotient between them (=Ts/Ts_t). Hereinafter, the warm-up degree of the fuel cell stack 10 will also be referred to as a "stack warm-up degree Wst_e".

Likewise, the warm-up degree of the evaporator 32 is defined as a parameter indicating to what degree the warm-up of the evaporator 32 has progressed relative to the completion of this warm-up. Therefore, the warm-up degree of the evaporator 32 can also be calculated in terms of to what degree the current evaporator temperature Tv approaches the temperature (the evaporator warm-up target temperature Tv_t) at which the warm-up of the evaporator 32 should be finished.

For example, the bypass valve opening degree control unit B100 calculates, as the warm-up degree of the evaporator 32, a ratio of the evaporator temperature Tv to the evaporator warm-up target temperature Tv_t. For example, the ratio of the evaporator temperature Tv to the evaporator warm-up target temperature Tv_t can be calculated as the deviation between them or the quotient between them (=Tv/Tv_t). Hereinafter, the warm-up degree of the evaporator 32 will also be referred to as an "evaporator warm-up degree Wv_e".

The bypass valve opening degree control unit B100 calculates a target bypass air flow rate qby_t being a target value of the bypass air flow rate qby so that the evaporator temperature Tv (the evaporator warm-up degree Wv_e) and the stack temperature Ts (the stack warm-up degree Wst_e) respectively become desired values. Then, the bypass valve opening degree control unit B100 operates the bypass valve 15a so that the bypass valve opening degree Oby approaches the target bypass valve opening degree Oby_t corresponding to the target bypass air flow rate qby_t.

For example, as the stack warm-up degree Wst_e increases, the bypass valve opening degree control unit B100 calculates the target bypass valve opening degree Oby_t to be greater so as to increase the bypass air flow rate qby (reduce the heat exchanger passing air flow rate qex). That is, in this case, the bypass valve opening degree control unit B100 increases the bypass valve opening degree Oby according to an increase of the stack warm-up degree Wst_e. Consequently, the increase of the stack warm-up degree Wst_e is suppressed.

On the other hand, as the evaporator warm-up degree Wv_e increases, the bypass valve opening degree control unit B100 calculates the target bypass valve opening degree Oby_t to be greater so as to reduce the bypass air flow rate qby (increase the heat exchanger passing air flow rate qex). That is, in this case, the bypass valve opening degree control unit B100 increases the bypass valve opening degree Oby according to an increase of the evaporator warm-up degree Wv_e. Consequently, the increase of the evaporator warm-up degree Wv_e is suppressed.

Then, the evaporator temperature Tv detected by the evaporator temperature sensor 101, the stack temperature Ts detected by the stack air electrode inlet temperature sensor 102, and the target bypass valve opening degree Oby_t calculated by the bypass valve opening degree control unit B100 are input to the injector control unit B110.

Based on the evaporator temperature Tv (the evaporator warm-up degree Wv_e) and the stack temperature Ts (the stack warm-up degree Wst_e) and referring to the target bypass valve opening degree Oby_t, the injector control unit B110 controls the opening degree of the second injector 37 to adjust the fuel injection amount Fcomb being an injection amount of fuel to the discharged gas combustor 12.

Specifically, referring to the target bypass valve opening degree Oby_t, the injector control unit B110 calculates a target fuel injection amount Fcomb_t being a target value of the fuel injection amount Fcomb so that the evaporator temperature Tv (the evaporator warm-up degree Wv_e) and the stack temperature Ts (the stack warm-up degree Wst_e) take desired values. Then, the injector control unit B110 operates the second injector 37 to adjust its opening degree so that the fuel injection amount Fcomb approaches the target fuel injection amount Fcomb_t.

For example, as the evaporator warm-up degree Wv_e increases, the injector control unit B110 calculates the target fuel injection amount Fcomb_t to be smaller so as to reduce the fuel injection amount Fcomb. Further, for example, as the stack warm-up degree Wst_e increases, the injector control unit B110 calculates the target fuel injection amount Fcomb_t to be smaller so as to reduce the fuel injection amount Fcomb.

Next, an example of a further specific control aspect of the bypass valve opening degree Oby and the fuel injection amount Fcomb by the bypass valve opening degree control unit B100 and the injector control unit B110 described above will be described.

Figure 3:
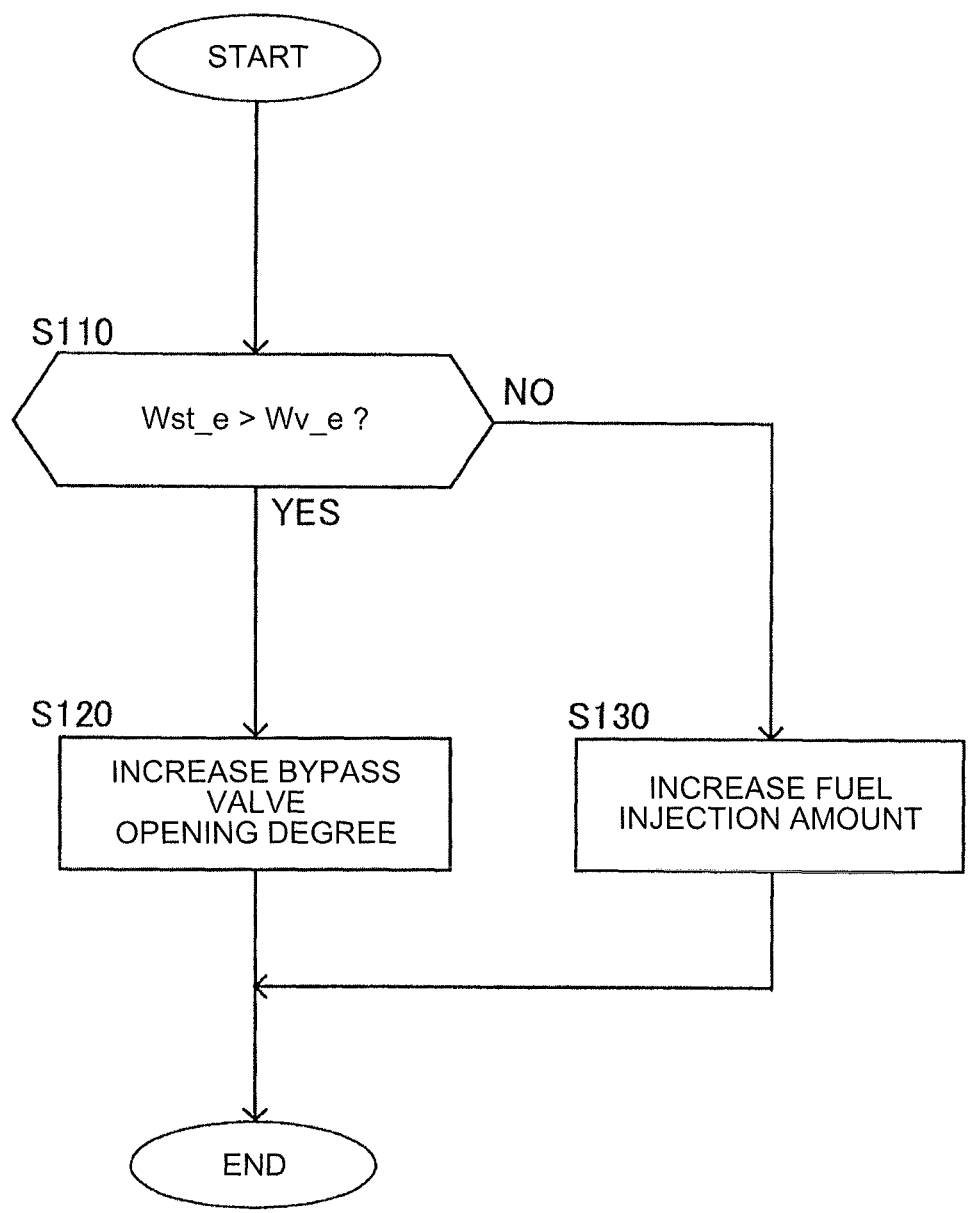
FIG. 3 is a flowchart explaining one aspect of the warm-up operation of the fuel cell system according to the first embodiment of the present invention.

FIG. 3 is a flowchart explaining one aspect of the control of the bypass valve opening degree Oby and the fuel injection amount Fcomb based on the stack warm-up degree Wst_e and the evaporator warm-up degree Wv_e according to this embodiment.

As illustrated, in a step S110, the controller 80 determines the magnitude relationship between the stack warm-up degree Wst_e and the evaporator warm-up degree Wv_e. Then, when the controller 80 has determined that the stack warm-up degree Wst_e is greater than the evaporator warm-up degree Wv_e, it performs a process of a step S120.

Herein, the stack warm-up degree Wst_e being greater than the evaporator warm-up degree Wv_e means a case where the progress of the warm-up of the evaporator 32 is slow compared to the progress of the warm-up of the fuel cell stack 10.

In such a case, for example, it may happen that even though the evaporation of raw fuel in the evaporator 32 cannot be properly performed, the stack temperature Ts of the fuel cell stack 10 increases to a certain value or more. As a result, even though a fuel gas is not sufficiently supplied to the anode electrode of the fuel cell stack 10, since the stack temperature Ts becomes high, the inside of the anode electrode becomes an oxidizing atmosphere in which oxidation reactions tend to proceed. When the inside of the anode electrode becomes the oxidizing atmosphere, undesirable oxidation reactions other than an oxidation reaction according to normal power generation tend to occur as a result of reactions between oxygen and materials, such as the catalyst, forming the anode electrode.

In particular, when the inside of the anode electrode becomes the oxidizing atmosphere in the state where the warm-up of the fuel cell stack 10 has progressed to a degree at which the stack temperature Ts exceeds the above-described oxidative degradation point, there is a possibility that nickel forming the anode catalyst and oxygen react irreversibly with each other to degrade the anode catalyst.

Further, in this case, when the warm-up of the fuel cell stack 10 is not suppressed but continued along with the warm-up of the evaporator 32 even though the warm-up of the fuel cell stack 10 has progressed to some degree, it is not preferable in terms of the heat resistance of the fuel cell stack 10. In this regard, according to this embodiment, the occurrence of such a situation is suppressed by the process of the step S120.

Specifically, in the step S120, the controller 80 increases the bypass valve opening degree Oby. Consequently, the ratio of air bypassing the air heat exchanger 14 in the main air supply passage 24 is increased (see FIG. 1). Therefore, the heat exchanger passing air flow rate qex is reduced so that the substantial heating amount by the air heat exchanger 14 for air to be supplied to the fuel cell stack 10 is reduced. As a result, the heating amount of the fuel cell stack 10 is reduced so that the temperature rise of the fuel cell stack 10 is suppressed.

On the other hand, when the heat exchanger passing air flow rate qex is reduced, the calorific value that is transferred to the air from a combustion gas, produced in the discharged gas combustor 12, by the heat exchange in the air heat exchanger 14 is reduced. Therefore, the calorific value of the after-fuel-cell-heating combustion gas (the after-stack-heating combustion gas) that is supplied to the evaporator 32 after the heat exchange is increased so that the heating amount of the evaporator 32 is increased to increase the warm-up rate of the evaporator 32.

That is, by increasing the bypass valve opening degree Oby, it is possible to increase the warm-up rate of the evaporator 32 while reducing the warm-up rate of the fuel cell stack 10.

Therefore, since the warm-up rate of the fuel cell stack 10 can be suppressed by performing the process of the step S120, it is possible to suppress the occurrence of oxidation reactions in the anode electrode of the fuel cell stack 10, i.e. it is possible to suppress that the inside of the anode electrode falls into an oxidizing atmosphere. Further, since the temperature rise of the fuel cell stack 10 is suppressed, it is possible to protect the constituent components of the fuel cell stack 10 more reliably also in terms of heat resistance.

On the other hand, since the warm-up rate of the evaporator 32 is increased, the evaporator temperature Tv can be made to approach the evaporator warm-up target temperature Tv_t more quickly. Therefore, the evaporator temperature Tv can reach the temperature, at which the evaporation of raw fuel by the evaporator 32 is enabled, more reliably before the stack temperature Ts reaches the above-described temperature at which oxidative degradation of the anode catalyst can occur.

On the other hand, in the step S110 described above, when it is determined that the stack warm-up degree Wst_e is not greater than the evaporator warm-up degree Wv_e, that is, when it is determined that the evaporator warm-up degree Wv_e is greater than the stack warm-up degree Wst_e, the controller 80 performs a process of a step S130.

Herein, the evaporator warm-up degree Wv_e being greater than the stack warm-up degree Wst_e means a case where the progress of the warm-up of the fuel cell stack 10 is slow compared to the progress of the warm-up of the evaporator 32.

In this case, the situation is such that the evaporator temperature Tv is likely to reach the operating temperature (the temperature at which the evaporation of raw fuel is enabled) of the evaporator 32 before the stack temperature Ts reaches the temperature at which oxidative degradation of the anode catalyst can occur. Therefore, in terms of quickly completing the warm-up operation, the second injector 37 is controlled to increase the fuel injection amount Fcomb.

Therefore, in the step S130, in terms of quickly completing the warm-up operation, the controller 80 controls the second injector 37 to increase the fuel injection amount Fcomb. Consequently, the temperature rise (warm-up) of both the fuel cell stack 10 and the evaporator 32 is promoted.

According to the fuel cell system S of this embodiment described above, the following actions and effects are exhibited.

The fuel cell system S of this embodiment includes the fuel cell stack 10 as a fuel cell that is supplied with fuel and air to generate electricity, the evaporator 32 that evaporates the fuel to be supplied to the fuel cell stack 10, the off-gas heating device (the discharged gas combustor) 12 that heats an off-gas (cathode off-gas and anode off-gas) discharged from the fuel cell stack 10 to produce a heating gas (combustion gas), the fuel cell heating device (14, 15, 15a) that heats the air to be supplied to the fuel cell stack 10 by the combustion gas, the evaporator heating device (14, 15a, 40) that heats the evaporator 32 by the combustion gas, the stack air electrode inlet temperature sensor 102 as a fuel cell temperature acquisition unit that acquires a temperature of the fuel cell stack 10, and the evaporator temperature sensor 101 as an evaporator temperature acquisition unit that acquires a temperature of the evaporator 32.

The fuel cell system S includes the controller 80 ("the bypass valve opening degree control unit B100" and "the injector control unit B110" in FIG. 2) that, in the warm-up operation to perform the warm-up of the fuel cell stack 10 and the warm-up of the evaporator 32, controls the evaporator heating device (14, 15a, 40) and the fuel cell heating device (14, 15, 15a) based on the evaporator temperature Tv being the temperature of the evaporator 32 and the stack temperature Ts being the temperature of the fuel cell stack 10, thereby adjusting the heating amount of the off-gas (the fuel injection amount Fcomb) and the heating amount of the air by the heating gas (the heat exchanger passing air flow rate qex).

Consequently, the warm-up progress balance can be properly controlled according to the progress states of the warm-up of the fuel cell stack 10 and the warm-up of the evaporator 32 based on the stack temperature Ts and the evaporator temperature Tv. Therefore, it is possible to suppress the inconvenience that is caused by unbalance of the progress degrees of the warm-up of the fuel cell stack 10 and the warm-up of the evaporator 32, for example, the inconvenience such as the loss of heat resistance of the fuel cell stack 10 and the evaporator 32, or the occurrence of oxidative degradation reactions in the anode electrode.

In particular, according to this embodiment, the fuel cell heating device (14, 15, 15a) includes the air heat exchanger 14 provided to the main air supply passage 24 being an air supply passage for supplying the air to the fuel cell stack 10 and configured to perform the heat exchange of the air in the main air supply passage 24 with the heating gas, the bypass passage 15 provided to the main air supply passage 24 to bypass the air heat exchanger 14, and the bypass valve 15a provided in the bypass passage 15. The evaporator heating device (14, 15a, 40) includes the bypass valve 15a and an evaporator gas supply passage 40a being an after-fuel-cell-heating gas supply system that supplies an after-fuel-cell-heating gas, which is the heating gas after being used for the heat exchange in the air heat exchanger 14, to the evaporator 32.

The controller 80 (the bypass valve opening degree control unit B100 in FIG. 2) controls the bypass valve opening degree Oby being an opening degree of the bypass valve 15a to adjust the heat exchanger passing air flow rate qex being an air flow rate to be supplied to the air heat exchanger 14.

With this configuration, the heat exchanger passing air flow rate qex can be adjusted by operating the bypass valve 15a to adjust the bypass valve opening degree Oby. Consequently, by adjusting the air flow rate that is heat-exchanged with the heating gas in the air heat exchanger 14, it is possible to control the calorific value of the air to be supplied to the fuel cell stack 10, i.e. the heating amount of the fuel cell stack 10, and the calorific value of the after-fuel-cell-heating gas after the heat exchange, i.e. the heating amount of the evaporator 32.

That is, in the warm-up operation, it is possible to properly control both the heating amount of the fuel cell stack 10 and the heating amount of the evaporator 32 by operating the bypass valve 15a. Therefore, the balance between the stack warm-up degree Wst_e and the evaporator warm-up degree Wv_e can be achieved by operating the bypass valve 15a as the single actuator.

For example, by increasing the bypass valve opening degree Oby to increase the bypass air flow rate qby, the heat exchanger passing air flow rate qex is reduced. Therefore, the air that is heat-exchanged with the heating gas in the air heat exchanger 14 is relatively reduced. Consequently, the calorific value of the air that is supplied to the fuel cell stack 10 after the heat exchange is reduced. That is, the heating rate of the fuel cell stack 10 by this air is reduced so that it is possible to suppress the warm-up rate of the fuel cell stack 10.

On the other hand, when the heat exchanger passing air flow rate qex is reduced, the calorific value of the heating gas that is lost by the heat exchange with the air in the air heat exchanger 14 is reduced so that the calorific value of the after-fuel-cell-heating gas after the heat exchange is increased. Therefore, since the heating amount of the evaporator 32 by the after-fuel-cell-heating gas is increased, the warm-up rate of the evaporator 32 is improved.

That is, by increasing the bypass valve opening degree Oby, it is possible to improve the warm-up rate of the evaporator 32 while reducing the warm-up rate of the fuel cell stack 10.

Further, conversely, when the bypass valve opening degree Oby is reduced to reduce the bypass air flow rate qby, since the heat exchanger passing air flow rate qex is increased, it is possible to improve the warm-up rate of the fuel cell stack 10 while reducing the warm-up rate of the evaporator 32.

In particular, in the fuel cell system S of this embodiment, it is configured that even when the bypass valve 15a is in the fully open state (even when the bypass valve opening degree Oby is maximum), the bypass valve 15a provides the bypass air flow rate qby that prevents the evaporator temperature Tv from exceeding the predetermined upper limit temperature.

Consequently, the calorific value of the after-stack-heating combustion gas that is supplied to the evaporator 32 after the heat exchange in the air heat exchanger 14 is limited. As a result, the temperature of the after-stack-heating combustion gas when it is discharged to the outside after heating the evaporator 32 can be limited to a certain value or less. Therefore, the exhaust gas temperature of the vehicle equipped with the fuel cell system S can be lowered more reliably.

Instead of adjusting (designing) the configuration of the bypass valve 15a so that the evaporator temperature Tv does not exceed the predetermined upper limit temperature as described above, or along with this, the configuration, such as the pipe diameter or length, of the bypass passage 15 may be adjusted (designed).

For example, the bypass passage 15 may be configured to have a diameter that, even when the bypass valve 15a is in the fully open state, provides the bypass air flow rate qby that prevents the evaporator temperature Tv from exceeding the above-described upper limit temperature. Alternatively, both the configuration of the bypass valve 15a and the configuration of the bypass passage 15 may be properly adjusted so that the evaporator temperature Tv does not exceed the above-described upper limit temperature.

In the fuel cell system S of this embodiment, the off-gas heating device (12, 37) includes the discharged gas combustor 12 that produces the combustion gas as the heating gas by burning the off-gas, and a fuel supply amount adjustment unit (37) that adjusts the fuel injection amount Fcomb being an amount of the fuel to be supplied to the discharged gas combustor 12. The controller 80 controls the fuel supply amount adjustment unit (37) to adjust the fuel injection amount Fcomb.

Consequently, the function of the off-gas heating device (12, 37) to heat the off-gas of the fuel cell stack 10 can be realized by the existing discharged gas combustor 12. That is, the function of producing the combustion gas as the heating gas for use in heating the fuel cell stack 10 and heating the evaporator 32 can be realized without causing complication of the configuration of the fuel cell system S.

The fuel cell system S of this embodiment further includes the raw fuel tank 28 storing liquid fuel being raw fuel, the combustor fuel supply passage 36 for supplying the fuel from the raw fuel tank 28 to the discharged gas combustor 12, the combustion gas passage 40 as a combustion gas supply passage for supplying the combustion gas produced in the discharged gas combustor 12 to the air heat exchanger 14, and the evaporator gas supply passage 40a as an evaporator gas supply passage for supplying the after-fuel-cell-heating combustion gas, which is the combustion gas after being used for heating the fuel cell stack 10 in the fuel cell heating device (14, 15, 15a), to the evaporator heating device (14, 15a, 40). The off-gas heating device (12, 37) includes the second injector 37. The controller 80 (the injector control unit B110) controls the second injector 37 to adjust the fuel injection amount Fcomb.

According to this embodiment, the specific system configuration as described above for performing the warm-up operation in the fuel cell system S is provided. In particular, according to this system configuration, since the calorific value of the combustion gas that is produced in the discharged gas combustor 12 can be adjusted by adjusting the fuel injection amount Fcomb, both the warm-up rate of the fuel cell stack 10 and the warm-up rate of the evaporator 32 by this combustion gas can be properly controlled.

Further, in the warm-up operation of this embodiment, the controller 80 reduces the amount of the air for the heat exchange with the combustion gas (the heating amount of the air) when the stack warm-up degree Wst_e based on the stack temperature Ts is greater than the evaporator warm-up degree Wv_e based on the evaporator temperature Tv. More specifically, when the stack warm-up degree Wst_e is greater than the evaporator warm-up degree Wv_e, the bypass valve opening degree Oby is increased to reduce the heat exchanger passing air flow rate qex (the step S110 and the step S120 in FIG. 3).

Consequently, when the progress of the warm-up of the fuel cell stack 10 is advanced relative to the progress of the warm-up of the evaporator 32, it is possible to reduce the heating amount of the fuel cell stack 10 to suppress the warm-up rate thereof. Therefore, for example, in the state where the warm-up of the fuel cell stack 10 is advanced relative to the warm-up of the evaporator 32 so that the stack temperature Ts may reach the temperature at which undesirable oxidation reactions occur in the anode electrode, it is possible to delay the progress of the warm-up of the fuel cell stack 10. That is, it is possible to suppress the heating (temperature rise) of the fuel cell stack 10 until the warm-up of the evaporator 32 progresses to some degree to enable the evaporation of the fuel so that it is possible to supply a fuel gas to the fuel cell stack 10. As a result, it is possible to suppress the occurrence of undesirable oxidation reactions in the anode electrode during the warm-up operation. Since the heating of the fuel cell stack 10 is suppressed in this way, the protection of the constituent components of the fuel cell stack 10 in terms of heat resistance can also be made more appropriate.

Further, according to this embodiment, the controller 80 increases the heating amount of the off-gas when the evaporator warm-up degree Wv_e is greater than the stack warm-up degree Wst_e (step S130 in FIG. 3).

When the evaporator warm-up degree Wv_e is greater than the stack warm-up degree Wst_e, the situation is such that the evaporator temperature Tv is likely to reach the operating temperature of the evaporator 32 (the temperature at which the evaporation of raw fuel is enabled) before the stack temperature Ts reaches the temperature at which oxidative degradation of the anode catalyst can occur. Therefore, in this case, it is possible to quickly complete the warm-up operation by controlling the second injector 37 to increase the fuel injection amount Fcomb.

According to this embodiment, preferably, the stack warm-up degree Wst_e is the ratio of the acquired stack temperature Ts to the stack warm-up target temperature Ts_t being a warm-up target temperature of the fuel cell stack 10, and the evaporator warm-up degree Wv_e is the ratio of the acquired evaporator temperature Tv to the evaporator warm-up target temperature Tv_t being a warm-up target temperature of the evaporator 32.

By defining the stack warm-up degree Wst_e and the evaporator warm-up degree Wv_e by the parameters in this way, it is possible to properly grasp the progress state of the warm-up of the fuel cell stack 10 and the progress state of the warm-up of the evaporator 32 during the warm-up operation.

According to this embodiment, the fuel cell temperature acquisition unit is configured as the stack air electrode inlet temperature sensor 102 that detects the temperature of the air to be supplied to the fuel cell stack 10. Consequently, it is possible to properly detect the temperature of the fuel cell stack 10.

On the other hand, instead of using the air electrode inlet temperature of the fuel cell stack 10 as "the stack temperature Ts", the stack outlet temperature Ts_out being the air electrode outlet temperature of the fuel cell stack 10 or the average value of the air electrode inlet temperature and the air electrode outlet temperature may be used as "the stack temperature Ts". In particular, in the situation where the warm-up of the fuel cell stack 10 has progressed to some degree so that the heat loss of air in the fuel cell stack 10 is low, or the like, setting "the stack temperature Ts" by taking into account the air electrode outlet temperature in addition to the air electrode inlet temperature makes it possible to improve the accuracy of control in the warm-up operation using such a "stack temperature Ts".

According to this embodiment, the evaporator temperature acquisition unit is configured as the evaporator temperature sensor 101 that acquires the temperature of the heating gas after being used for heating evaporated by the evaporator 32. Consequently, it is possible to properly detect the temperature of the evaporator 32. However, the temperature of the evaporator 32 may be estimated using, for example, a temperature sensor provided at another place.

Further, according to this embodiment, one aspect of a warm-up method performed by the fuel cell system S described above is provided.

Specifically, according to this embodiment, there is provided a method for warming up the fuel cell system S, wherein the method includes: producing a heating gas by heating an off-gas discharged from the fuel cell stack 10 as a fuel cell that is supplied with fuel and air to generate electricity; and using the heating gas to heat the air to be supplied to the fuel cell stack 10 and to heat the evaporator 32 that evaporates raw fuel as the fuel to be supplied to the fuel cell stack 10.

In this warm-up method, the heating amount of the off-gas (the fuel injection amount Fcomb) and the heating amount of the air by the heating gas (the heat exchanger passing air flow rate qex) are adjusted based on the stack temperature Ts being the temperature of the fuel cell stack 10 and the evaporator temperature Tv being the temperature of the evaporator 32.

Consequently, the warm-up progress balance can be properly controlled according to the progress states of the warm-up of the fuel cell stack 10 and the warm-up of the evaporator 32 based on the stack temperature Ts and the evaporator temperature Tv. Therefore, it is possible to suppress the inconvenience such as the loss of heat resistance of the fuel cell stack 10 and the evaporator 32, or the occurrence of oxidative degradation reactions in the anode electrode, which is caused by unbalance of the progress degrees of the warm-up of the fuel cell stack 10 and the warm-up of the evaporator 32.

(First Variant)

Next, a first variant of the above-described embodiment will be described. The same symbols will be assigned to like elements as those in the above-described embodiment, thereby omitting a description thereof.

Figure 4:
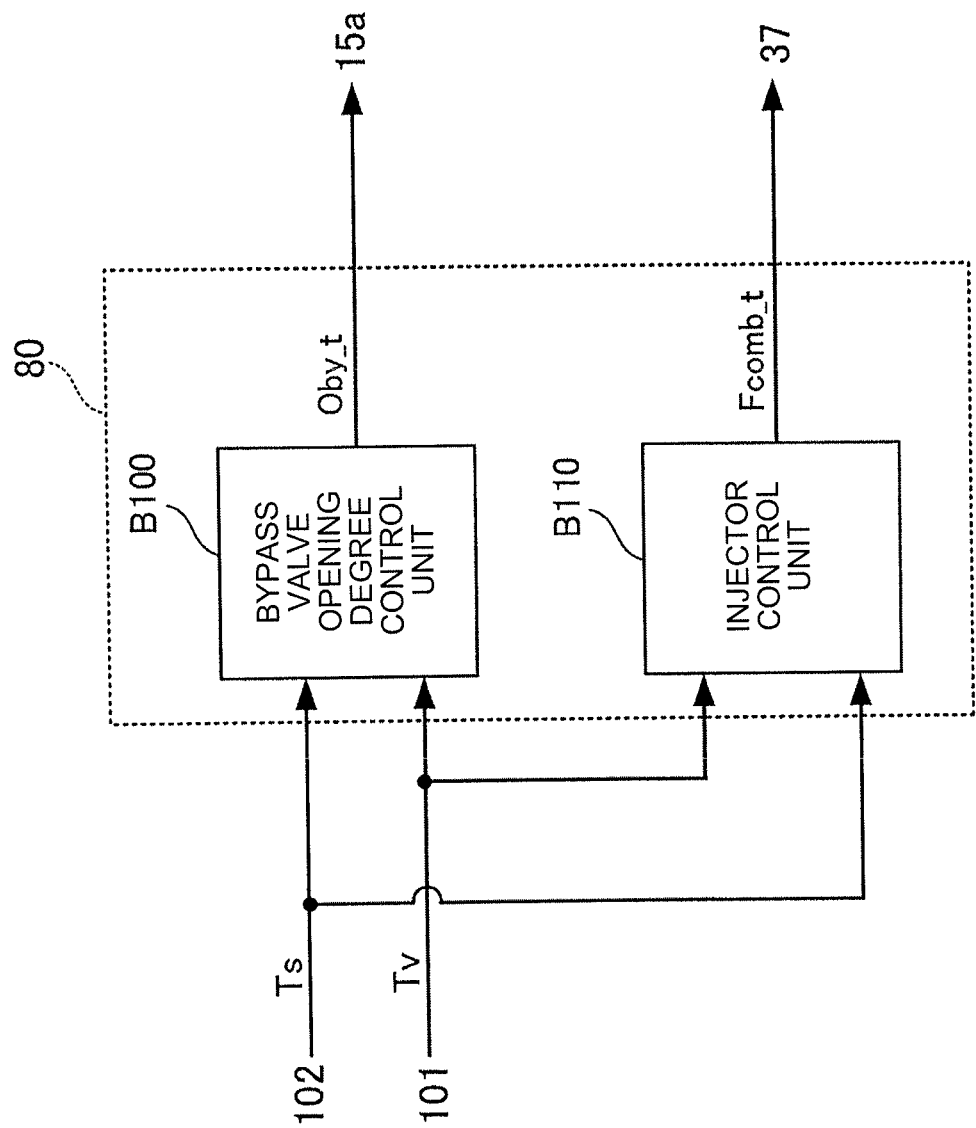
FIG. 4 is a block diagram explaining a warm-up operation of the fuel cell system according to a first variant of the first embodiment of the present invention.

FIG. 4 is a block diagram explaining the warm-up operation of the fuel cell system S in the first variant.

As illustrated, this variant differs from the above-described embodiment in that the injector control unit B110 of the controller 80 controls the second injector 37 based on the stack temperature Ts (the stack warm-up degree Wst_e) and the evaporator temperature Tv (the evaporator warm-up degree Wv_e). That is, the target bypass valve opening degree Oby_t is not referred to in the control of the injector control unit B110.

Also in the case of this variant, like in the first embodiment, the bypass valve opening degree control unit B100 operates the bypass valve 15a based on the stack warm-up degree Wst_e and the evaporator warm-up degree Wv_e.

On the other hand, the injector control unit B110 calculates the target fuel injection amount Fcomb_t so that the evaporator temperature Tv (the evaporator warm-up degree Wv_e) and the stack temperature Ts (the stack warm-up degree Wst_e) respectively become desired values, and controls the opening degree of the second injector 37 based on the target fuel injection amount Fcomb_t.

Therefore, even with the configuration of this variant, like in the first embodiment, it is possible to properly perform the warm-up operation while considering the mutual progress balance of the warm-up of the fuel cell stack 10 and the warm-up of the evaporator 32.

(Second Variant)

Next, a second variant of the above-described embodiment will be described. The same symbols will be assigned to like elements as those in the above-described embodiment, thereby omitting a description thereof.

Figure 5:
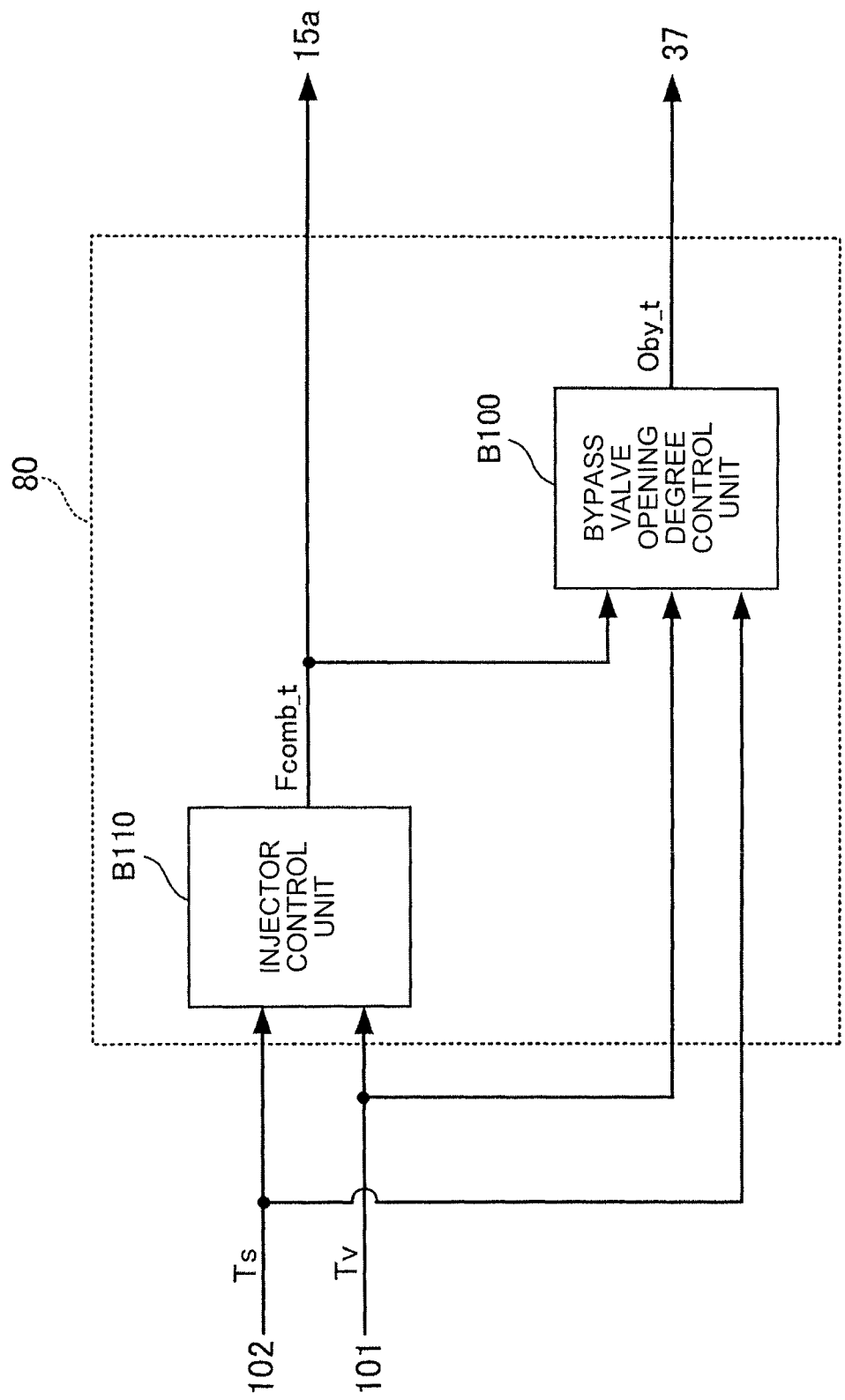
FIG. 5 is a block diagram explaining a warm-up operation of the fuel cell system according to a second variant of the first embodiment of the present invention.

FIG. 5 is a block diagram explaining the warm-up operation of the fuel cell system S in the second variant.

As illustrated, in this variant, the injector control unit B110 calculates the target fuel injection amount Fcomb_t so that the evaporator temperature Tv (the evaporator warm-up degree Wv_e) and the stack temperature Ts (the stack warm-up degree Wst_e) respectively become desired values, and controls the opening degree of the second injector 37 based on the target fuel injection amount Fcomb_t.

On the other hand, referring to the target fuel injection amount Fcomb_t calculated by the injector control unit B110, the bypass valve opening degree control unit B100 calculates the target bypass air flow rate qby_t, which does not cause a large deviation of the stack warm-up degree Wst_e from the evaporator warm-up degree Wv_e, so that the evaporator temperature Tv (the evaporator warm-up degree Wv_e) and the stack temperature Ts (the stack warm-up degree Wst_e) respectively become desired values, and operates the bypass valve 15*a* based on the target bypass air flow rate qby_t.

Therefore, even with the configuration of this variant, like in the first embodiment, it is possible to properly perform the warm-up operation while considering the mutual progress balance of the warm-up of the fuel cell stack 10 and the warm-up of the evaporator 32.

The above-described embodiment, the first variant, and the second variant are only examples of aspects of the present invention, and various changes can be made thereto within the scope of the present invention.

For example, the respective configurations of the fuel cell system S illustrated in FIG. 1 are only examples and are not intended to limit the configuration of the present invention thereto. Specifically, the configuration of the off-gas heating device (the discharged gas combustor 12, the combustor fuel supply passage 36, and the second injector 37) can be replaced by an arbitrary device that can adjust the calorific value to be produced, such as a heater that can adjust the output, or another combustor that can adjust the supply amount of fuel.

The configuration of the fuel cell heating device (the air heat exchanger 14, the bypass passage 15, and the bypass valve 15*a*) can be replaced by an arbitrary device that can adjust the heating amount while heating air to be supplied to the fuel cell stack 10 using a heating gas from the off-gas heating device. For example, instead of the configuration employing the bypass passage 15 and the bypass valve 15*a*, the air flow rate that is supplied to the air heat exchanger 14 (the heating amount of the fuel cell stack 10) may be adjusted by properly changing the output of the air pump 38 in FIG. 1. Alternatively, an air supply device such as a pump that supplies air to the air heat exchanger 14 may be separately provided, and the air flow rate that is supplied to the air heat exchanger 14 may be adjusted by controlling the output of this air supply device.

Likewise, the configuration of the evaporator heating device (14, 15*a*, 40) may be other than that described in the above-described embodiment and variants, and it may be configured by another flow passage and a valve provided in the flow passage, which can adjust the supply flow rate of a heating gas (the heating amount) from the off-gas heating device to the evaporator 32.

Further, the parameters that indicate "the stack warm-up degree Wst_e" and "the evaporator warm-up degree Wv_e" are not necessarily limited to those in the above-described embodiment and variants. It is possible to employ other arbitrary parameters that can indicate the progress degree of the warm-up of the fuel cell stack 10 and the progress degree of the warm-up of the evaporator 32.

Second Embodiment

Hereinafter, a second embodiment of the present invention will be described. The same symbols will be assigned to like elements as those in the first embodiment or each of the variants, thereby omitting a description thereof.

Figure 6:
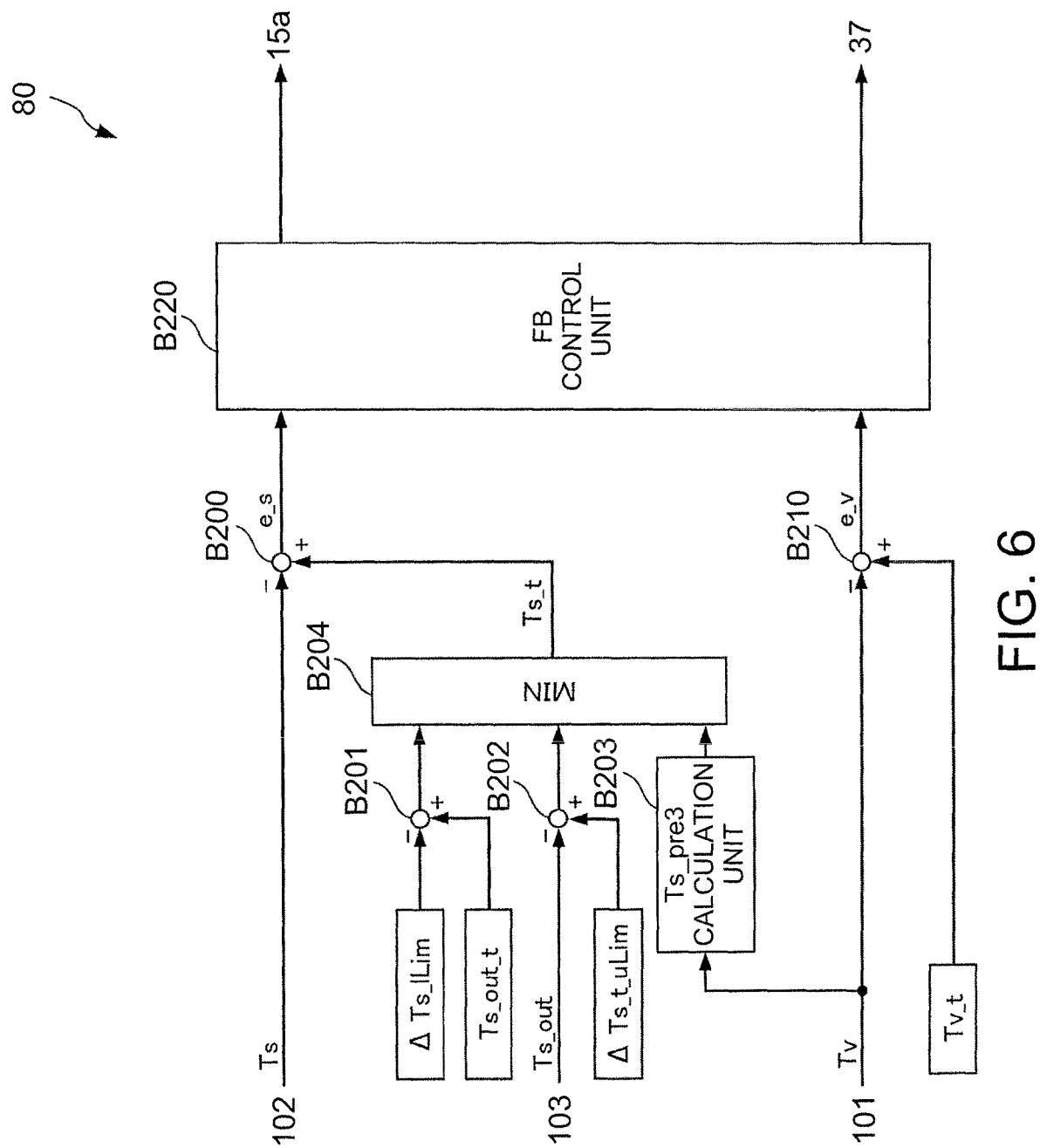
FIG. 6 is a block diagram explaining a warm-up operation of a fuel cell system according to a second embodiment of the present invention.

FIG. 6 is a block diagram explaining a warm-up operation of the fuel cell system S according to this embodiment. The functions of calculation units illustrated in this block diagram are realized by the hardware and software (programs) forming the controller 80.

As illustrated, the controller 80 of this embodiment includes a stack temperature deviation calculation unit B200, an evaporator temperature deviation calculation unit B210, and a feedback control unit B220.

The stack temperature deviation calculation unit B200 subtracts the stack temperature Ts from the stack warm-up target temperature Ts_t to calculate a stack temperature deviation e_s. That is, $e\_s = Ts\_t - Ts$. Since the stack temperature deviation e_s is a kind of a parameter related to a ratio of the stack temperature Ts to the stack warm-up target temperature Ts_t, the stack temperature deviation e_s is regarded as "the stack warm-up degree Wst_e" according to this embodiment.

According to this embodiment, the controller 80 changes the stack warm-up target temperature Ts_t during the warm-up operation according to the state of the fuel cell system S. In particular, according to this embodiment, the controller 80 sets the stack warm-up target temperature Ts_t according to the magnitude of the acquired evaporator temperature Tv, or the difference between the temperature of the air electrode inlet of the fuel cell stack 10 and the temperature of the air electrode outlet of the fuel cell stack 10 (hereinafter also referred to as a "stack inlet-outlet temperature difference $\Delta Ts$").

Specifically, the controller 80 includes, as a configuration for setting the stack warm-up target temperature Ts_t, a first tentative stack target temperature calculation unit B201, a second tentative stack target temperature calculation unit B202, a third tentative stack warm-up target temperature calculation unit B203, and a minimum selection unit B204.

A temperature difference lower limit value $\Delta Ts\_ILim$ being a lower limit value of the stack inlet-outlet temperature difference $\Delta Ts$ and a target stack outlet temperature Ts_out_t being a target value of the stack outlet temperature Ts_out are input to the first tentative stack target temperature calculation unit B201.

The first tentative stack target temperature calculation unit B201 subtracts the temperature difference lower limit value $\Delta Ts\_ILim$ from the target stack outlet temperature Ts_out_t to calculate a first tentative target stack temperature Ts_pre1 and transmits it to the minimum selection unit B204.

Herein, the target stack outlet temperature Ts_out_t is a temperature which the stack outlet temperature Ts_out should reach in a relatively initial stage of the warm-up operation or the like. The temperature difference lower limit value $\Delta Ts\_ILim$ is determined in terms of suppressing the problem of heat resistance that is caused by an increase of the stack inlet-outlet temperature difference $\Delta Ts$ due to rapid heating of air that is supplied to the fuel cell stack 10.

That is, according to the configuration of the fuel cell system S of this embodiment, the warm-up of the fuel cell stack 10 is performed by supplying the air heated by the air heat exchanger 14 to the inlet of the fuel cell stack 10, and therefore, the rate of the temperature rise is higher in the vicinity of the air electrode inlet than in the vicinity of the air electrode outlet. Accordingly, for example, in the case where the warm-up of the fuel cell stack 10 is quickly performed, or the like, it is conceivable that the temperature rise in the vicinity of the air electrode outlet cannot follow the temperature rise in the vicinity of the air electrode inlet so that the temperature distribution of the fuel cell stack 10 increases to affect the heat resistance.

In view of this situation, according to this embodiment, the temperature difference lower limit value $\Delta Ts\_ILim$ is set so as to prevent the stack inlet temperature from excessively rising by the warm-up of the fuel cell stack 10 that is performed until the stack outlet temperature Ts_out reaches the target stack outlet temperature Ts_out_t. That is, the limit is put on the rise of the stack temperature Ts using the first tentative target stack temperature Ts_pre1 obtained by subtracting the temperature difference lower limit value ΔTs_ILim from the target stack outlet temperature Ts_out_t, thereby suppressing that the stack inlet-outlet temperature difference ΔTs becomes excessively large during the warm-up of the fuel cell stack 10.

The temperature difference lower limit value ΔTs_ILim may be set to various values and can be set to, for example, about 300° C.

Next, the stack outlet temperature Ts_out from the stack air electrode outlet temperature sensor 103 and an allowable temperature difference upper limit value ΔTs_uLim being an upper limit value of the stack inlet-outlet temperature difference ΔTs are input to the second tentative stack target temperature calculation unit B202.

The second tentative stack target temperature calculation unit B202 subtracts the stack outlet temperature Ts_out from the allowable temperature difference upper limit value ΔTs_uLim to calculate a second tentative target stack temperature Ts_pre2 and transmits it to the minimum selection unit B204.

Herein, the allowable temperature difference upper limit value ΔTs_uLim is the upper limit value of the stack inlet-outlet temperature difference ΔTs that can be allowed in terms of suppressing the adverse effect on the heat resistance of the fuel cell stack 10 in the middle to late stage of the warm-up operation or the like. Therefore, the second tentative target stack temperature Ts_pre2 obtained by subtracting the stack outlet temperature Ts_out from the allowable temperature difference upper limit value ΔTs_uLim is a provisional target value of the stack temperature Ts that is determined in terms of limiting the stack temperature Ts to prevent the stack inlet-outlet temperature difference ΔTs from exceeding the above-described allowable upper limit value.

Next, the evaporator temperature Tv is input to the third tentative stack warm-up target temperature calculation unit B203. The third tentative stack warm-up target temperature calculation unit B203 calculates a third tentative target stack temperature Ts_pre3 based on the evaporator temperature Tv.

Figure 7:
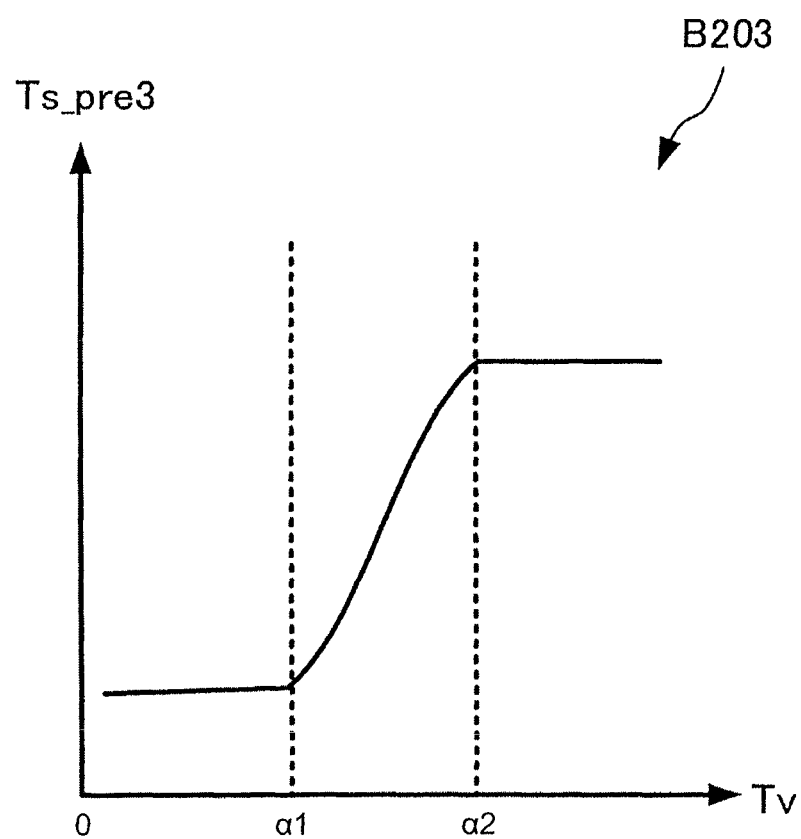
FIG. 7 illustrates one example of a table for calculating a third tentative target stack temperature.

FIG. 7 illustrates one example of a table for calculating the third tentative target stack temperature Ts_pre3 from the evaporator temperature Tv.

The third tentative stack warm-up target temperature calculation unit B203 calculates the third tentative target stack temperature Ts_pre3 from the evaporator temperature Tv based on the relationship illustrated in the figure. According to this embodiment, as illustrated, different calculation aspects of the third tentative target stack temperature Ts_pre3 are set at the boundaries representing the timings at which the evaporator temperature Tv becomes predetermined values α1, α2.

Specifically, when the evaporator temperature Tv is equal to or less than the predetermined value α1, the third tentative target stack temperature Ts_pre3 is set to a relatively small value, and the value is hardly changed regardless of the magnitude of the evaporator temperature Tv.

Herein, the case where the evaporator temperature Tv is equal to or less than the predetermined value α1 is a situation where, for example, the warm-up of the evaporator 32 is in the initial stage so that it is necessary to perform the heating of the evaporator 32 to a certain degree or more until the evaporation of raw fuel is performed by the evaporator 32.

In this case, if the warm-up of the fuel cell stack 10 is allowed to progress at the normal rate or more, there is a possibility that even though the evaporator 32 has not reached the temperature at which the evaporator 32 can evaporate the raw fuel sufficiently, the stack temperature Ts exceeds the oxidative degradation point, resulting in a state where there is a concern about oxidative degradation of the anode catalyst. Therefore, when the warm-up of the evaporator 32 is in the initial state as described above, the third tentative target stack temperature Ts_pre3 is set to be relatively small and is hardly changed, thereby limiting an increase of the stack temperature Ts to suppress the progress of the warm-up of the fuel cell stack 10.

Next, when the evaporator temperature Tv exceeds the predetermined value α1 and is equal to or less than the predetermined value α2, the third tentative target stack temperature Ts_pre3 is calculated so that the third tentative target stack temperature Ts_pre3 increases as the evaporator temperature Tv increases.

In this case, since the progress of the warm-up of the evaporator 32 has proceeded at least beyond the initial stage, the third tentative target stack temperature Ts_pre3 is calculated so as to release the limit put on the increase of the stack temperature Ts when the evaporator temperature Tv was equal to or less than the predetermined value α1. That is, in terms of quickly finishing the warm-up operation, the third tentative target stack temperature Ts_pre3 is increased as the evaporator temperature Tv increases, thereby also allowing the progress of the warm-up of the fuel cell stack 10 according to the progress of the warm-up of the evaporator 32.

Next, after the evaporator temperature Tv exceeds the predetermined value α2, the third tentative target stack temperature Ts_pre3 is set to a constant value. Herein, in the state where the evaporator temperature Tv has reached the predetermined value α2, the stack temperature Ts reaches the final stack warm-up target temperature Ts_t. Therefore, since it is not necessary to put a limit on a target value of the stack temperature Ts, the third tentative target stack temperature Ts_pre3 is set to the same value as this final stack warm-up target temperature Ts_t.

Referring back to FIG. 6, the minimum selection unit B204 calculates, as the stack warm-up target temperature Ts_t, the smallest value among the first tentative target stack temperature Ts_pre1 received from the first tentative stack target temperature calculation unit B201, the second tentative target stack temperature Ts_pre2 received from the second tentative stack target temperature calculation unit B202, and the third tentative target stack temperature Ts_pre3 received from the third tentative stack warm-up target temperature calculation unit B203, and outputs it to the stack temperature deviation calculation unit B200.

Consequently, the stack warm-up target temperature Ts_t can be obtained such that the third tentative target stack temperature Ts_pre3_that is determined in terms of achieving balance with the progress of the warm-up of the evaporator 32 is limited by the temperature difference lower limit value ΔTs_ILim that takes into account the heat resistance of the fuel cell stack 10 in the relatively initial stage of the warm-up operation, and the allowable temperature difference upper limit value ΔTs_uLim that takes into account the heat resistance of the fuel cell stack 10 in the middle to late stage of the warm-up operation. That is, the stack warm-up target temperature Ts_t becomes a value that takes into account the heat resistance of the fuel cell stack 10 during the warm-up operation and the balance with the evaporator warm-up degree Wv_e.

Next, the evaporator temperature Tv from the evaporator temperature sensor 101 and the evaporator warm-up target temperature Tv_t are input to the evaporator temperature deviation calculation unit B210.

The evaporator temperature deviation calculation unit B210 subtracts the evaporator temperature Tv from the evaporator warm-up target temperature Tv_t to calculate an evaporator temperature deviation e_v. That is, e_v=Tv_t−Tv. Since the evaporator temperature deviation e_v of this embodiment is a kind of a parameter related to a ratio of the acquired evaporator temperature Tv to the evaporator warm-up target temperature Tv_t, the evaporator temperature deviation e_v corresponds to "the evaporator warm-up degree Wv_e" according to this embodiment.

Then, the feedback control unit B220 receives the stack temperature deviation e_s from the stack temperature deviation calculation unit B200 and the evaporator temperature deviation e_v from the evaporator temperature deviation calculation unit B210. The feedback control unit B220 controls the bypass valve 15a and the second injector 37 based on the stack temperature deviation e_s and the evaporator temperature deviation e_v.

Figure 8:
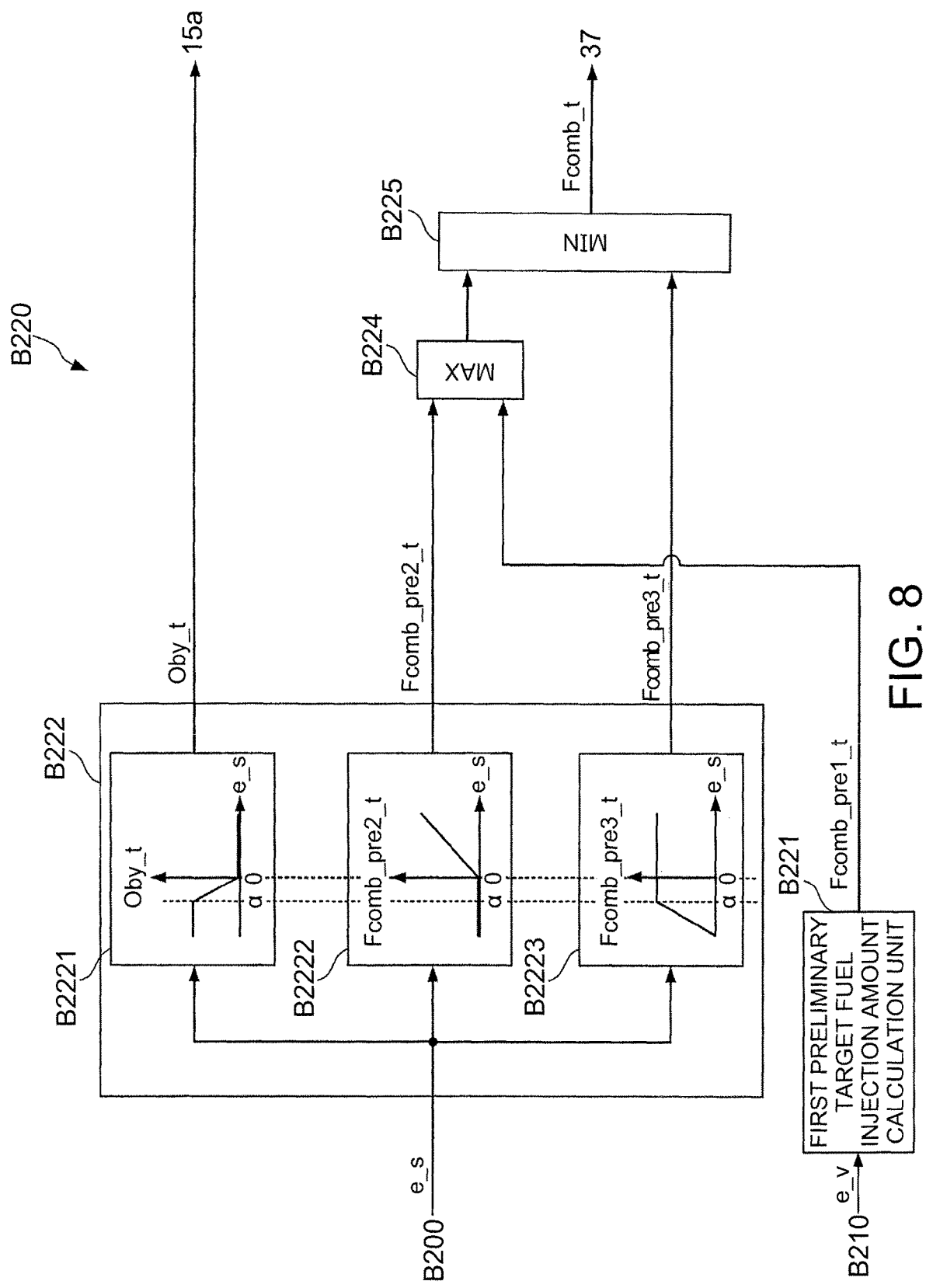
FIG. 8 is a block diagram explaining details of control in a feedback control unit according to the second embodiment of the present invention.

FIG. 8 is a block diagram for explaining details of the control in the feedback control unit B220.

As illustrated, the feedback control unit B220 includes a first tentative target fuel injection amount calculation unit B221, a basic control parameter calculation unit B222, a maximum selection unit B224, and a minimum selection unit B225.

The first tentative target fuel injection amount calculation unit B221 receives the evaporator temperature deviation e_v calculated by the evaporator temperature deviation calculation unit B210. Based on the evaporator temperature deviation e_v, the first tentative target fuel injection amount calculation unit B221 calculates a first tentative target fuel injection amount Fcomb_pre1_t being a tentative target value of the fuel injection amount Fcomb (corresponding to the opening degree of the second injector 37) in terms of the warm-up of the reformer 16.

Specifically, the first tentative target fuel injection amount calculation unit B221 calculates the first tentative target fuel injection amount Fcomb_pre1_t so that the fuel injection amount Fcomb is controlled in a direction to decrease as the evaporator temperature deviation e_v approaches zero according to the feedback control logic including at least an integral action. Then, the first tentative target fuel injection amount calculation unit B221 outputs the calculated first tentative target fuel injection amount Fcomb_pre1_t to the maximum selection unit B224.

On the other hand, the basic control parameter calculation unit B222 includes a bypass valve opening degree calculation unit B2221, a second tentative target fuel injection amount calculation unit B2222, and a third tentative target fuel injection amount calculation unit B2223.

The bypass valve opening degree calculation unit B2221 receives the stack temperature deviation e_s calculated by the stack temperature deviation calculation unit B200. The bypass valve opening degree calculation unit B2221 calculates the target bypass valve opening degree Oby_t of the bypass valve 15a based on the stack temperature deviation e_s.

Specifically, the bypass valve opening degree calculation unit B2221 calculates the target bypass valve opening degree Oby_t from the stack temperature deviation e_s based on a graph illustrated in the figure. Herein, in the graph in the figure, when the stack temperature deviation e_s≥0 (Ts_t□Ts≥0), the warm-up of the fuel cell stack 10 has not reached the target, and therefore, the bypass valve opening degree calculation unit B2221 prevents air in the main air supply passage 24 illustrated in FIG. 1 from bypassing the air heat exchanger 14 and causes all the air to pass through the air heat exchanger 14. That is, the opening degree of the bypass valve 15a is set to zero (fully closed) to promote the warm-up of the fuel cell stack 10 by heating the air to be supplied to the fuel cell stack 10 by the air heat exchanger 14 as much as possible.

In the graph in the figure, when the stack temperature deviation e_s<0 (Ts_t□Ts<0), the warm-up of the fuel cell stack 10 has reached the target. Therefore, in this case, in order to suppress the heating amount of the fuel cell stack 10, as the stack temperature deviation e_s decreases, the air flow rate that bypasses the air heat exchanger 14 is increased (the heat exchanger passing air flow rate qex is reduced). That is, the target bypass valve opening degree Oby_t is calculated to increase the opening degree of the bypass valve 15a as the stack temperature deviation e_s decreases.

In the graph in the figure, when the stack temperature deviation e_s is in a region where it is equal to or less than a predetermined value α, the opening degree of the bypass valve 15a is fully open. That is, the opening degree of the bypass valve 15a cannot be increased further, and therefore, when suppressing the heating rate of the fuel cell stack 10 in this state, it is necessary to perform control to reduce the fuel injection amount Fcomb as appropriate. This will be described later.

Next, the second tentative target fuel injection amount calculation unit B2222 receives the stack temperature deviation e_s calculated by the stack temperature deviation calculation unit B200. Based on the stack temperature deviation e_s, the second tentative target fuel injection amount calculation unit B2222 calculates a second tentative target fuel injection amount Fcomb_pre2_t being a tentative target value of the fuel injection amount Fcomb in terms of maintaining the heating amount of the fuel cell stack 10 at a certain value or more according to the stack warm-up degree Wst_e.

Specifically, the second tentative target fuel injection amount calculation unit B2222 calculates the second tentative target fuel injection amount Fcomb_pre2_t from the stack temperature deviation e_s based on a graph illustrated in the figure according to the feedback control logic including at least an integral action. Herein, in the graph in the figure, when the stack temperature deviation e_s≥0 where the warm-up of the fuel cell stack 10 has not reached the target, the second tentative target fuel injection amount calculation unit B2222 calculates the second tentative target fuel injection amount Fcomb_pre2_t so as to reduce the fuel injection amount Fcomb as the stack temperature deviation e_s decreases. Consequently, the calorific value of a combustion gas that is produced in the discharged gas combustor 12 can be adjusted to maintain the warm-up rate of the fuel cell stack 10 at a certain value or more according to an increase of the stack temperature Ts.

In the graph in the figure, when the stack temperature deviation e_s<0 (Ts_t□Ts<0) where the stack temperature Ts has reached the target, the second tentative target fuel injection amount Fcomb_pre2_t is set to zero.

Further, the second tentative target fuel injection amount calculation unit B2222 outputs the calculated second tentative target fuel injection amount Fcomb_pre2_t to the maximum selection unit B224.

Next, the third tentative target fuel injection amount calculation unit B2223 receives the stack temperature deviation e_s calculated by the stack temperature deviation calculation unit B200. Based on the stack temperature deviation e_s, the third tentative target fuel injection amount calculation unit B2223 calculates a third tentative target fuel injection amount Fcomb_pre3_t being a tentative target value of the fuel injection amount Fcomb in terms of performing the warm-up of the fuel cell stack 10 and the warm-up of the evaporator 32 at appropriate rates.

Specifically, the third tentative target fuel injection amount calculation unit B2223 calculates the third tentative target fuel injection amount Fcomb_pre3_t from the stack temperature deviation e_s based on a graph illustrated in the figure. Herein, in the graph in the figure, until the stack temperature deviation e_s=a where the opening degree of the bypass valve 15*a* is fully open, i.e. until the stack temperature Ts becomes higher than the stack warm-up target temperature Ts_t by the predetermined value α or more, the third tentative target fuel injection amount calculation unit B2223 calculates the third tentative target fuel injection amount Fcomb_pre3_t so that the fuel injection amount Fcomb becomes a desired value by adjusting the opening degree of the second injector 37.

Therefore, as the third tentative target fuel injection amount Fcomb_pre3_t, as illustrated in the graph in the figure, basically, the fuel injection amount Fcomb is set that corresponds to an appropriate opening degree of the second injector 37 that is determined in terms of performing the warm-up of the fuel cell stack 10 and the warm-up of the evaporator 32 at appropriate rates.

On the other hand, as in the control by the bypass valve opening degree calculation unit B2221 described above, when the stack temperature deviation e_s becomes equal to or less than the predetermined value α, the opening degree of the bypass valve 15*a* cannot be increased so that it is not possible to increase the air flow rate that bypasses the air heat exchanger 14.

Therefore, according to this embodiment, the third tentative target fuel injection amount calculation unit B2223 calculates the third tentative target fuel injection amount Fcomb_pre3_t so as to reduce the fuel injection amount Fcomb as the stack temperature deviation e_s decreases in a region where the stack temperature deviation e_s is equal to or less than the predetermined value α. That is, in the situation where the heating rate of the fuel cell stack 10 cannot be adjusted by the change in the opening degree of the bypass valve 15*a*, the third tentative target fuel injection amount Fcomb_pre3_t is calculated to limit the fuel injection amount Fcomb according to an increase of the stack temperature Ts.

Further, the third tentative target fuel injection amount calculation unit B2223 outputs the calculated third tentative target fuel injection amount Fcomb_pre3_t to the minimum selection unit B225.

Next, the maximum selection unit B224 receives the first tentative target fuel injection amount Fcomb_pre1_t from the first tentative target fuel injection amount calculation unit B221 and receives the second tentative target fuel injection amount Fcomb_pre2_t from the second tentative target fuel injection amount calculation unit B2222.

The maximum selection unit B224 outputs Max (pre1, pre2), which is greater between the first tentative target fuel injection amount Fcomb_pre1_t and the second tentative target fuel injection amount Fcomb_pre2_t, to the minimum selection unit B225.

That is, the maximum selection unit B224 selects a greater value between the first tentative target fuel injection amount Fcomb_pre1_t that is determined in terms of maintaining the warm-up rate of the evaporator 32 at a certain value or more, and the second tentative target fuel injection amount Fcomb_pre2_t that is determined in terms of maintaining the warm-up rate of the fuel cell stack 10 at a certain value or more. Therefore, when Max (pre1, pre2) is set as the target fuel injection amount Fcomb_t, the warm-up rates of both the fuel cell stack 10 and the evaporator 32 can be maintained at certain values or more.

Next, the minimum selection unit B225 receives Max (pre1, pre2) from the maximum selection unit B224 and the third tentative target fuel injection amount Fcomb_pre3_t from the third tentative target fuel injection amount calculation unit B2223.

The minimum selection unit B225 selects a smaller value between Max (pre1, pre2) and the third tentative target fuel injection amount Fcomb_pre3_t as the final target fuel injection amount Fcomb_t.

That is, the minimum selection unit B225 sets, as the final target fuel injection amount Fcomb_t, a smaller value between Max (pre1, pre2) that is determined in terms of maintaining the warm-up rates of both the fuel cell stack 10 and the evaporator 32 at certain values or more, and the third tentative target fuel injection amount Fcomb_pre3_t that is determined in terms of the adjustment of the heating rate of the fuel cell stack 10 after the opening degree of the bypass valve 15*a* becomes fully open (the stack temperature deviation e_s=α).

Therefore, until the bypass valve 15*a* is fully opened, the fuel injection amount Fcomb is controlled in terms of maintaining the warm-up rates of both the fuel cell stack 10 and the evaporator 32. On the other hand, after the stack temperature Ts exceeds the stack warm-up target temperature Ts_t so that the bypass valve 15*a* is fully opened (region of the stack temperature deviation e_s≤α), the fuel injection amount Fcomb is controlled to suppress an increase of the stack temperature Ts.

One operation according to the control logic of the controller 80 of this embodiment described above will be described.

Figure 9:
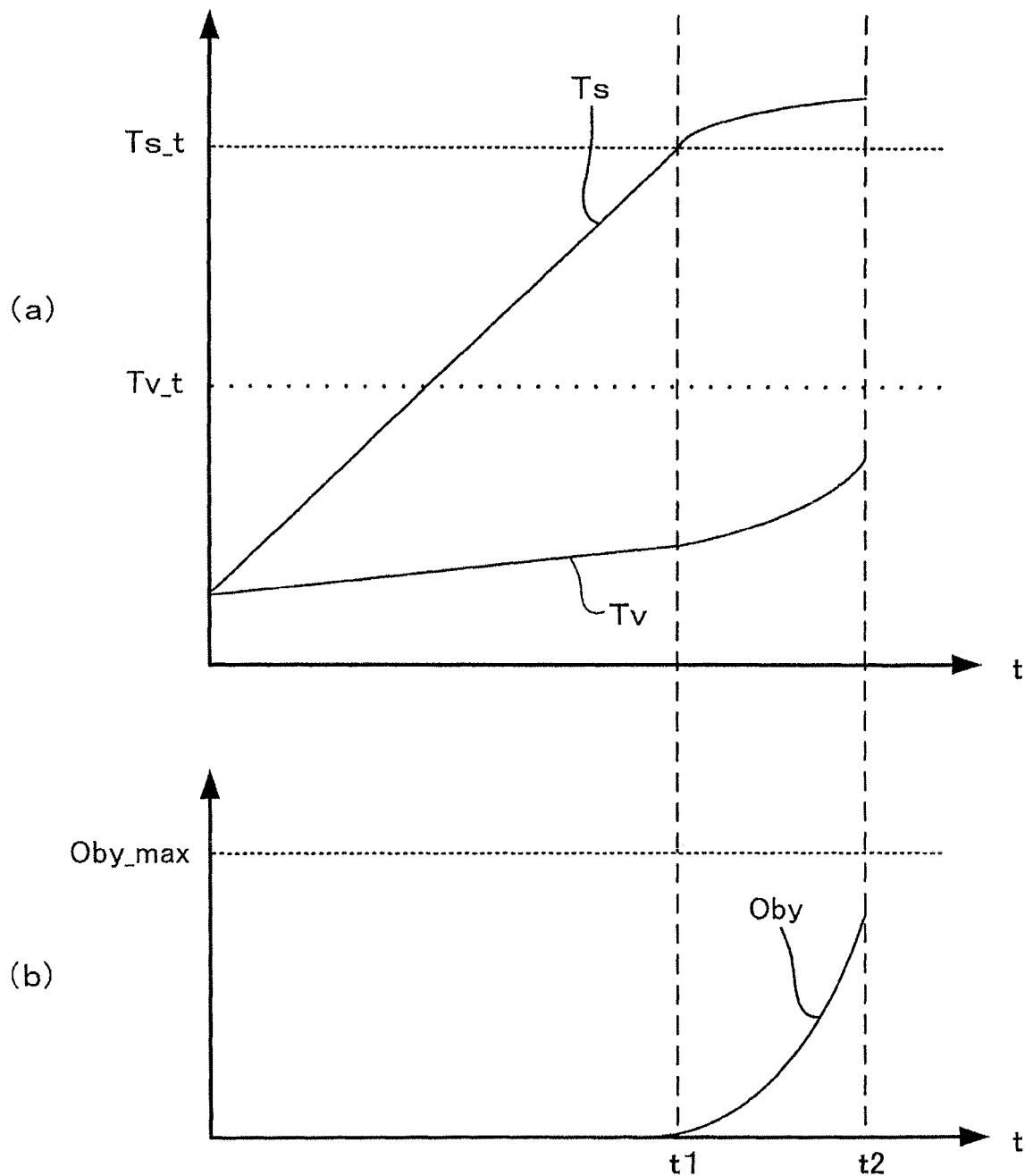
FIG. 9 is a timing chart illustrating one example of the temporal variation of the warm-up operation according to the second embodiment of the present invention.

FIG. 9 illustrates a result of the warm-up operation according to this embodiment subject to the control logic described in FIGS. 6 to 8. In particular, FIG. 9(*a*) illustrates the temporal changes of the stack temperature Ts and the evaporator temperature Tv during the warm-up operation, and FIG. 9(*b*) illustrates the temporal change of the bypass valve opening Oby during the warm-up operation.

As illustrated, until a time t1 at which the stack temperature Ts reaches the stack warm-up target temperature Ts_t, the controller 80 controls the fuel injection amount Fcomb and performs the warm-up of the fuel cell stack 10 and the warm-up of the evaporator 32 according to the control logic of the first tentative target fuel injection amount calculation unit B221, the second tentative target fuel injection amount calculation unit B2222, the third tentative target fuel injection amount calculation unit B2223, the minimum selection unit B225, and the related units in FIG. 8.

Then, at the time t1, when the stack temperature Ts has reached the stack warm-up target temperature Ts_t, the controller 80 operates the bypass valve 15*a* to increase the bypass valve opening degree Oby according to the control logic of the bypass valve opening degree calculation unit B2221.

At the time t1, while the stack temperature Ts has reached the stack warm-up target temperature Ts_t, the warm-up of the evaporator 32 is not completed. In this case, while suppressing the heating amount of the fuel cell stack 10 in terms of the heat resistant protection of the fuel cell stack 10 and so on, it is necessary to continue the warm-up of the evaporator 32. In this regard, according to this embodiment, by increasing the bypass valve opening degree Oby, it is possible to promote the heating amount (temperature rise) of the evaporator 32 while suppressing the heating amount (temperature rise) of the fuel cell stack 10 as illustrated in FIG. 9(a), Although not illustrated in FIG. 9(b), after a time t2, the bypass valve opening degree Oby is maintained at the maximum opening degree to promote an increase of the evaporator temperature Tv while suppressing an increase of the stack temperature Ts, but when the stack temperature deviation e_s becomes equal to or larger than a certain value (equal to or larger than a in the bypass valve opening degree calculation unit B2221) although the bypass valve opening degree Oby has reached the maximum opening degree, the fuel injection amount Fcomb is limited according to the control logic of the third tentative target fuel injection amount calculation unit B2223. That is, when the heating amount of the fuel cell stack 10 cannot be limited by the operation of the bypass valve 15a, the excessive temperature rise of the fuel cell stack 10 is suppressed by reducing the calorific value of a combustion gas itself that is produced in the discharged gas combustor 12.

Further, according to this embodiment, as described above, the first tentative target fuel injection amount calculation unit B221 and the second tentative target fuel injection amount calculation unit B2222 calculate the first tentative target fuel injection amount Fcomb_pre1_t and the second tentative target fuel injection amount Fcomb_pre2_t according to the feedback control logic including an integral action.

On the other hand, as illustrated in FIG. 8, since one of the first tentative target fuel injection amount Fcomb_pre1_t and the second tentative target fuel injection amount Fcomb_pre2_t is selected by the maximum selection unit B224, the other value not selected is not used in the control of the fuel injection amount Fcomb. In this case, it is conceivable that a state where the deviation does not approach zero continues in the feedback control logic that calculates the other value not selected. As a result, the integral action in this feedback control logic is repeated to increase a term of the integral action. Consequently, there is a possibility that the other value not selected is calculated as a value greater than expected.

Then, when the state of the warm-up operation, such as the stack temperature Ts or the evaporator temperature Tv, is changed so that the above-described other value not selected is selected by the maximum selection unit B224, the second injector 37 is operated based on this value that is greater than expected, resulting in the occurrence of overshoot or hunting.

In this regard, according to this embodiment, the integral action is stopped in the calculation unit that calculates the other value not selected by the maximum selection unit B224. Specifically, when the first tentative target fuel injection amount Fcomb_pre1_t is greater than the second tentative target fuel injection amount Fcomb_pre2_t, the integral action by the second tentative target fuel injection amount calculation unit B2222 is stopped. On the other hand, when the second tentative target fuel injection amount Fcomb_pre2_t is greater than the first tentative target fuel injection amount Fcomb_pre1_t, the integral action by the first tentative target fuel injection amount calculation unit B221 is stopped. Consequently, it is possible to suppress a reduction in control accuracy that is caused by overshoot, hunting, or the like due to the repetition of the integral action described above.

According to the fuel cell system S of this embodiment described above, the following actions and effects are exhibited in addition to the actions and effects described in the first embodiment.

In the fuel cell system S according to this embodiment, the controller 80 reduces the heating amount of air by a heating gas when the warm-up of the fuel cell stack 10 is completed earlier than the warm-up of the evaporator 32. Specifically, according to this embodiment, the bypass valve opening degree Oby is increased (see after the time t1 in FIG. 9(b)).

Consequently, in the state where the warm-up of the fuel cell stack 10 is completed while the warm-up of the evaporator 32 is not completed, it is possible to continue increasing the evaporator temperature Tv while suppressing the rise of the stack temperature Ts. Therefore, it is possible to suppress the influence on the heat resistance that is caused by continuing the heating of the fuel cell stack 10 along with the warm-up of the evaporator 32 even though the warm-up of the fuel cell stack 10 is completed.

In particular, in the fuel cell system S according to this embodiment, as described with reference to FIG. 1 and so on, the heating amount of the fuel cell stack 10 is reduced and the heating amount of the evaporator 32 is increased by increasing the bypass valve opening degree Oby.

Therefore, according to the configuration of this embodiment, only by operating the bypass valve 15a as the single actuator, while suppressing the excessive temperature rise of the fuel cell stack 10 to further ensure the heat resistant protection of the fuel cell stack 10 during the warm-up operation, it also contributes to quicker completion of the warm-up operation by promoting the warm-up of the evaporator 32 whose warm-up is not completed.

Further, in the fuel cell system S according to this embodiment, the controller 80 limits an increase in the calorific value of a heating gas when the amount of air for heat exchange with a combustion gas being the heating gas has reached a predetermined lower limit value. That is, when the stack temperature deviation e_s becomes equal to or less than the predetermined value α where the opening degree of the bypass valve 15a is fully open, the fuel injection amount Fcomb is limited (see the third tentative target fuel injection amount calculation unit B2223 in FIG. 7).

Consequently, in the situation where the heating rate of the fuel cell stack 10 cannot be further suppressed by the control of opening the bypass valve 15a, it is possible to suppress the heating rate of the fuel cell stack 10 by limiting the fuel injection amount Fcomb.

Therefore, for example, in the state where the evaporator warm-up degree Wv_e is low relative to the stack warm-up degree Wst_e even though the bypass valve 15a is fully opened so that the fuel evaporation of the evaporator 32 is not ready to start and thus it is not possible to sufficiently supply a fuel gas to the fuel cell stack 10, it is possible to suppress the warm-up rate of the fuel cell stack 10. That is, in such a state, it is possible to suppress the temperature rise of the fuel cell stack 10, thereby suppressing oxidative degradation reactions in the anode electrode described above.

Further, as the more detailed configuration of the fuel cell system S according to this embodiment, the controller 80 is configured to: as the ratio of the acquired temperature of the evaporator 32 (the evaporator temperature Tv) to the warm-up target temperature of the evaporator (the evaporator warm-up target temperature Tv_t), set the evaporator temperature deviation e_v obtained by subtracting the evaporator temperature Tv from the evaporator warm-up target temperature Tv_t (the evaporator temperature deviation calculation unit B210 in FIG. 6); and, as the ratio of the acquired temperature of the fuel cell (the stack temperature Ts) to the warm-up target temperature of the fuel cell (the stack warm-up target temperature Ts_t), set the stack temperature deviation e_s as a fuel cell temperature deviation obtained by subtracting the stack temperature Ts from the stack warm-up target temperature Ts_t (the stack temperature deviation calculation unit B200).

Then, the controller 80 is configured to: based on the evaporator temperature deviation e_v, calculate the first tentative target fuel injection amount Fcomb_pre1_t corresponding to an evaporator required off-gas heating amount being a heating amount of the off-gas required by the evaporator 32 (the first tentative target fuel injection amount calculation unit B221 in FIG. 8); and, based on the stack temperature deviation e_s, calculate the second tentative target fuel injection amount Fcomb_pre2_t corresponding to a fuel cell required off-gas heating amount being a heating amount of the off-gas required by the fuel cell stack 10 (the second tentative target fuel injection amount calculation unit B2222).

Further, the controller 80 is configured to: set the target fuel injection amount Fcomb_t corresponding to an off-gas heating amount target value being a target value of the heating amount of the off-gas based on the first tentative target fuel injection amount Fcomb_pre1_t and the second tentative target fuel injection amount Fcomb_pre2_t (the maximum selection unit B224 and the minimum selection unit B225); and control the second injector 37 based on the target fuel injection amount Fcomb_t.

Consequently, there is provided the specific aspect of the fuel cell system S that can properly adjust the balance between the evaporator warm-up degree Wv_e and the stack warm-up degree Wst_e based on the evaporator temperature Tv and the stack temperature Ts in the warm-up operation.

In particular, according to this embodiment, the controller 80 sets the target fuel injection amount Fcomb_t by selecting the greater value between the first tentative target fuel injection amount Fcomb_pre1_t and the second tentative target fuel injection amount Fcomb_pre2_t (the maximum selection unit B224 in FIG. 8).

Consequently, the greater value between the first tentative target fuel injection amount Fcomb_pre1_t that is determined in terms of the evaporator warm-up degree Wv_e, and the second tentative target fuel injection amount Fcomb_pre2_t that is determined in terms of the stack warm-up degree Wst_e can be made a candidate for the target fuel injection amount Fcomb_t. Therefore, by controlling the second injector 37 based on the target fuel injection amount Fcomb_t, the warm-up rates of both the fuel cell stack 10 and the evaporator 32 can be maintained at certain values or more.

Further, according to this embodiment, the controller 80 performs calculation of the first tentative target fuel injection amount Fcomb_pre1_t and calculation of the second tentative target fuel injection amount Fcomb_pre2_t by feedback control including an integral action. Then, the controller 80 stops the integral action when the calculation of the value not selected in setting the target fuel injection amount Fcomb_t is performed by the feedback control including the integral action.

Consequently, it is possible to suppress a reduction in control accuracy that is caused by overshoot, hunting, or the like due to the repetition of the integral action in the calculation of the value not selected in the maximum selection unit B224.

Further, as the more detailed configuration of the fuel cell system S according to this embodiment, the controller 80 is configured to: based on the stack temperature deviation e_s as the fuel cell temperature deviation, calculate the target bypass valve opening degree Oby_t corresponding to an air heating amount target value being a target value of the heating amount of the air by the heating gas required by the fuel cell stack 10; and control the bypass valve 15a based on the target bypass valve opening degree Oby_t (see the bypass valve opening degree calculation unit B2221 in FIG. 8).

Consequently, the stack temperature Ts during the warm-up operation can be properly adjusted by the simple control to operate the bypass valve 15a. In particular, as already described, the fuel cell system S according to this embodiment is configured to be able to adjust not only the heating amount of the fuel cell stack 10 but also the heating amount of the evaporator 32 by adjusting the bypass valve opening degree Oby. Therefore, for example, the balance of the warm-up rates can be properly adjusted such that when the stack temperature deviation e_s is small, the target bypass valve opening degree Oby_t is increased to suppress the heating amount of the fuel cell stack 10 to suppress the warm-up of the fuel cell stack 10, while increasing the heating amount of the evaporator 32 to promote the warm-up of the evaporator 32.

According to this embodiment, both the first tentative target fuel injection amount calculation unit B221 and the second tentative target fuel injection amount calculation unit B2222 are configured to respectively calculate the first tentative target fuel injection amount Fcomb_pre1_t and the second tentative target fuel injection amount Fcomb_pre2_t according to the feedback control logic including an integral action. However, the calculations in the first tentative target fuel injection amount calculation unit B221 and the second tentative target fuel injection amount calculation unit B2222 may be performed based on the feedback control logic including no integral action.

Alternatively, one of the first tentative target fuel injection amount calculation unit B221 and the second tentative target fuel injection amount calculation unit B2222 may perform the feedback control including an integral action, and the other may perform the feedback control including no integral action. In this case, it can be configured that when the calculation unit that calculates a value not selected by the maximum selection unit B224 is the calculation unit that performs the feedback control including the integral action, the integral action of this calculation unit is stopped.

Third Embodiment

Hereinafter, a third embodiment will be described. The same symbols will be assigned to like elements as those in the second embodiment, thereby omitting a description thereof.

According to this embodiment, the calculation of the target bypass valve opening degree Oby_t in the bypass valve opening degree calculation unit B2221 illustrated in FIG. 8 is changed.

Specifically, the bypass valve opening degree calculation unit B2221 predicts the warm-up completion timing of the fuel cell stack 10 and the warm-up completion timing of the evaporator 32 in the region where the stack temperature deviation e_s is equal to or larger than zero in the graph illustrated in FIG. 8, i.e. in the state where the stack temperature Ts has not reached the stack warm-up target temperature Ts_t. Then, it adjusts the time difference between the warm-up completion timing of the evaporator 32 and the warm-up completion timing of the fuel cell stack 10 to within a desired range.

In particular, according to this embodiment, when it is estimated that the warm-up completion timing of the evaporator 32 is delayed relative to the warm-up completion timing of the fuel cell stack 10, the balance between the heating amounts of them is adjusted by adjusting the bypass valve opening degree Oby so that the warm-up completion timing of the evaporator 32 and the warm-up completion timing of the fuel cell stack 10 are adjusted to be approximately the same.

Figure 10:
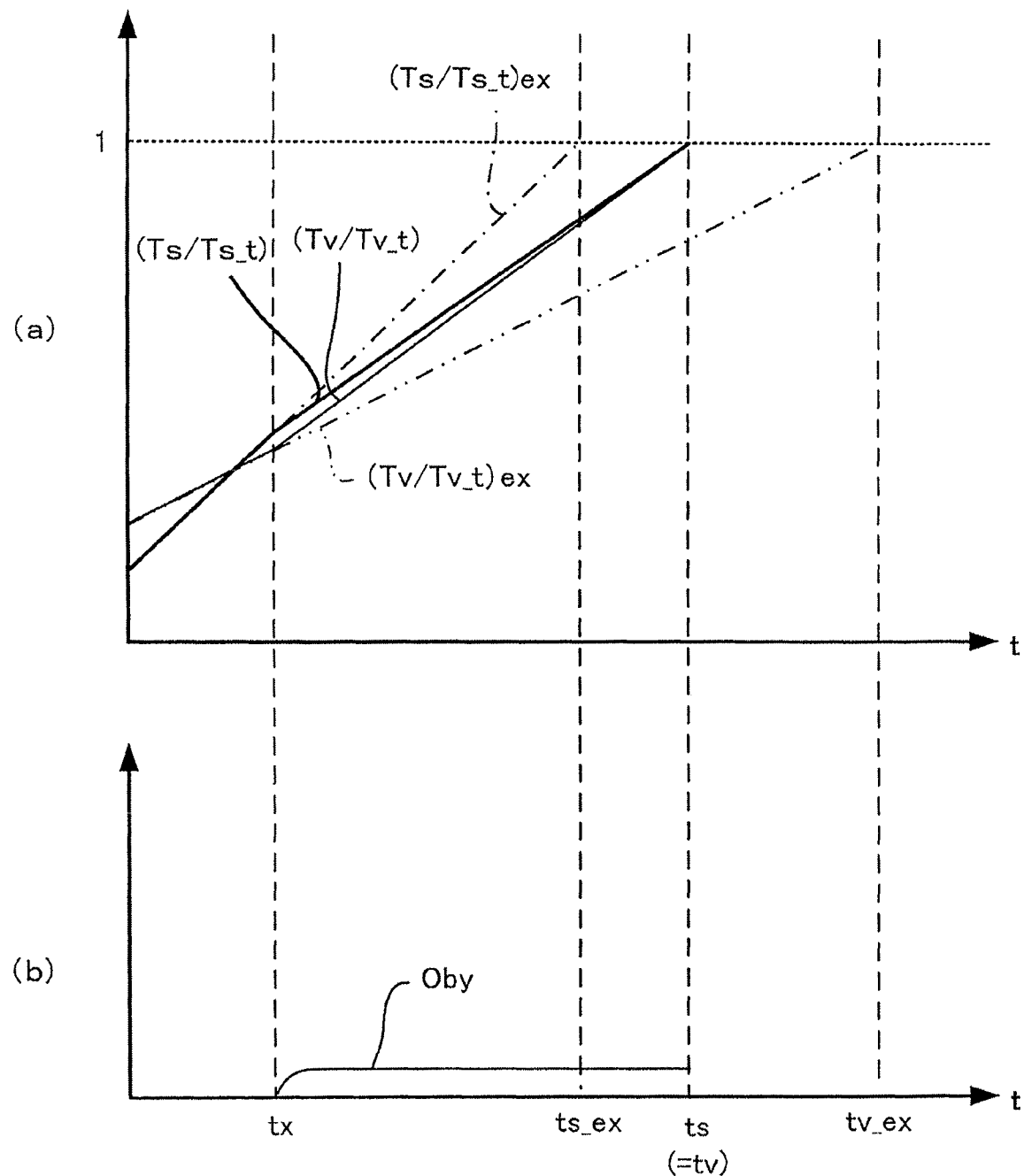
FIG. 10 is a timing chart illustrating one example of the temporal variation of a warm-up operation according to a third embodiment of the present invention.

FIG. 10 is a time chart illustrating one example of the temporal changes of the stack warm-up degree Wst_e and the evaporator warm-up degree Wv_e in a warm-up operation according to this embodiment. In particular, FIG. 10(a) illustrates the temporal changes of the stack warm-up degree Wst_e and the evaporator warm-up degree Wv_e, and FIG. 10(b) illustrates the temporal change of the bypass valve opening degree Oby.

Herein, (Ts/Ts_t) indicated in the figure represents a ratio of the current stack temperature Ts to the stack warm-up target temperature Ts_t and, as described in the first embodiment, is an index of the progress degree of the warm-up of the fuel cell stack 10. That is, it corresponds to the stack warm-up degree Wst_e. Therefore, hereinafter, it will also be referred to as a "stack warm-up progress degree (Ts/Ts_t)". Likewise, (Tv/Tv_t) represents a ratio of the current evaporator temperature Tv to the evaporator warm-up target temperature Tv_t and corresponds to the evaporator warm-up degree Wv_e. Therefore, hereinafter, it will also be referred to as an "evaporator warm-up progress degree (Tv/Tv_t)".

According to this embodiment, the bypass valve opening degree calculation unit B2221 is configured to calculate the stack warm-up progress degree (Ts/Ts_t) and the evaporator warm-up progress degree (Ts/Ts_t) at predetermined calculation intervals and store them in a memory, not shown, or the like.

Further, at a certain time tx at which neither the warm-up of the fuel cell stack 10 nor the warm-up of the evaporator 32 is completed, the bypass valve opening degree calculation unit B2221 calculates a stack warm-up completion predicted time ts_ex being a predicted time at which the warm-up of the fuel cell stack 10 is completed, and an evaporator warm-up completion predicted time tv_ex being a predicted time at which the warm-up of the evaporator 32 is completed.

Specifically, the bypass valve opening degree calculation unit B2221 reads the stack warm-up progress degrees (Ts/Ts_t) during a predetermined period of time before the time tx and calculates a change amount (slope) of the stack warm-up progress degrees (Ts/Ts_t) during the predetermined period of time.

Then, assuming that the warm-up of the fuel cell stack 10 progresses while keeping the calculated change amount of the stack warm-up progress degrees (Ts/Ts_t), the bypass valve opening degree calculation unit B2221 sets predicted stack warm-up progress degrees (Ts/Ts_t) ex (see a one-dot chain line in FIG. 10) as predicted values of the stack warm-up progress degrees (Ts/Ts_t) after the time tx. Further, the bypass valve opening degree calculation unit B2221 calculates, as the stack warm-up completion predicted time ts_ex, a time at which the predicted stack warm-up progress degree (Ts/Ts_t) ex becomes 1, i.e. a time at which the stack temperature Ts is predicted to reach the stack warm-up target temperature Ts_t.

Likewise, assuming that the warm-up of the evaporator 32 progresses while keeping the calculated change amount of the evaporator warm-up progress degrees (Tv/Tv_t), the bypass valve opening degree calculation unit B2221 sets predicted evaporator warm-up progress degrees (Tv/Tv_t) ex (see a two-dot chain line in FIG. 10) as predicted values of the evaporator warm-up progress degrees (Tv/Tv_t) after the time tx. Then, the bypass valve opening degree calculation unit B2221 calculates, as the evaporator warm-up completion predicted time tv_ex, a time at which the predicted evaporator warm-up progress degree (Tv/Tv_t) ex becomes 1, i.e. a time at which the evaporator temperature Tv is predicted to reach the evaporator warm-up target temperature Tv_t.

In the case of FIG. 10(a), the evaporator warm-up completion predicted time tv_ex exceeds the stack warm-up completion predicted time is ex as of the time tx. Therefore, the bypass valve opening degree calculation unit B2221 increases the bypass valve opening degree Oby to a predetermined value (see FIG. 10(b)) so as to match the warm-up completion timing of the fuel cell stack 10 and the warm-up completion timing of the evaporator 32.

Consequently, as already described, while the heating rate of the fuel cell stack 10 is suppressed, the heating rate of the evaporator 32 is increased. Therefore, as indicated by solid lines after time tx in FIG. 10(a), while the change amount (slope) of the stack warm-up progress degrees (Ts/Ts_t) is reduced, the change amount (slope) of the evaporator warm-up progress degrees (Tv/Tv_t) is increased. As a result, an actual stack warm-up completion time ts and an actual evaporator warm-up completion time tv almost coincide with each other. That is, the warm-up completion timing of the fuel cell stack 10 and the warm-up completion timing of the evaporator 32 are made almost the same.

According to the fuel cell system S of this embodiment described above, the following actions and effects are exhibited in addition to the actions and effects described in the first embodiment and the second embodiment.

In the fuel cell system S according to this embodiment, the controller 80 that functions as the bypass valve opening degree calculation unit B2221 is configured to, when the evaporator warm-up completion predicted time tv_ex being a predicted time at which the warm-up of the evaporator 32 is completed falls below the stack warm-up completion predicted time ts_ex (a fuel cell warm-up completion predicted time) being a predicted time at which the warm-up of the fuel cell stack 10 is completed, determine that the warm-up of fuel cell stack 10 is completed earlier than the warm-up of the evaporator 32, and perform a process to reduce the heating amount of stack supply air by a combustion gas, i.e. a process to increase the bypass valve opening degree Oby to a predetermined value (see FIG. 10(b)).

Consequently, in the state where neither the warm-up of the fuel cell stack 10 nor the warm-up of the evaporator 32 is completed, it can be determined in advance that the warm-up completion timing of the evaporator 32 is delayed relative to the warm-up completion timing of the fuel cell stack 10, and in that case, it is possible to suppress the heating amount of the fuel cell stack 10 to delay the warm-up completion timing of the fuel cell stack 10. Therefore, it is possible to allow the warm-up completion timing of the fuel cell stack 10 to further approach the warm-up completion timing of the evaporator 32.

In particular, according to this embodiment, with the configuration of the fuel cell system S as shown in FIG. 1, the process to increase the bypass valve opening degree Oby to the predetermined value is performed as the process to reduce the heating amount of the stack supply air by the combustion gas.

As already described, the process to increase the bypass valve opening degree Oby to the predetermined value can not only suppress the heating amount of the fuel cell stack 10, but also increase the heating amount of the evaporator 32. Therefore, by increasing the bypass valve opening degree Oby in this way, it is possible to advance the warm-up completion timing of the evaporator 32 while delaying the warm-up completion timing of the fuel cell stack 10, and therefore, the warm-up completion timing of the fuel cell stack 10 and the warm-up completion timing of the evaporator 32 can be matched more properly.

According to this embodiment, the description has been given of the example in which the warm-up completion timing of the fuel cell stack 10 and the warm-up completion timing of the evaporator 32 are made almost the same. However, for example, taking into account the relationship with other control parameters, when it is not necessarily appropriate to make these warm-up completion timings almost the same, the bypass valve opening degree Oby may be adjusted so that, at least, the warm-up completion timing of the fuel cell stack 10 approaches the warm-up completion timing of the evaporator 32, and preferably, the warm-up completion timing of the fuel cell stack 10 becomes earlier than the warm-up completion timing of the evaporator 32.

While the embodiments of the present invention have been described above, the above-described embodiments only show part of application examples of the present invention and are not intended to limit the technical scope of the present invention to the specific configurations of the above-described embodiments. Various variants and alterations can be made to the above-described embodiments within the scope of the matter recited in the claims.

For example, in the above-described embodiments and variants, in the warm-up operation to perform the warm-up of the fuel cell stack 10 and the warm-up of the evaporator 32, the balance between the evaporator warm-up degree Wv_e and the stack warm-up degree Wst_e is adjusted based on the evaporator temperature Tv and the stack temperature Ts.

However, in the warm-up operation to perform also the warm-up of the reformer 16 in addition to the warm-up of the fuel cell stack 10 and the warm-up of the evaporator 32, the mutual warm-up balance of them may be controlled based on the stack temperature Ts, the evaporator temperature Tv, and the temperature of the reformer 16 (hereinafter referred to as a "reformer temperature Tr").

Figure 11:
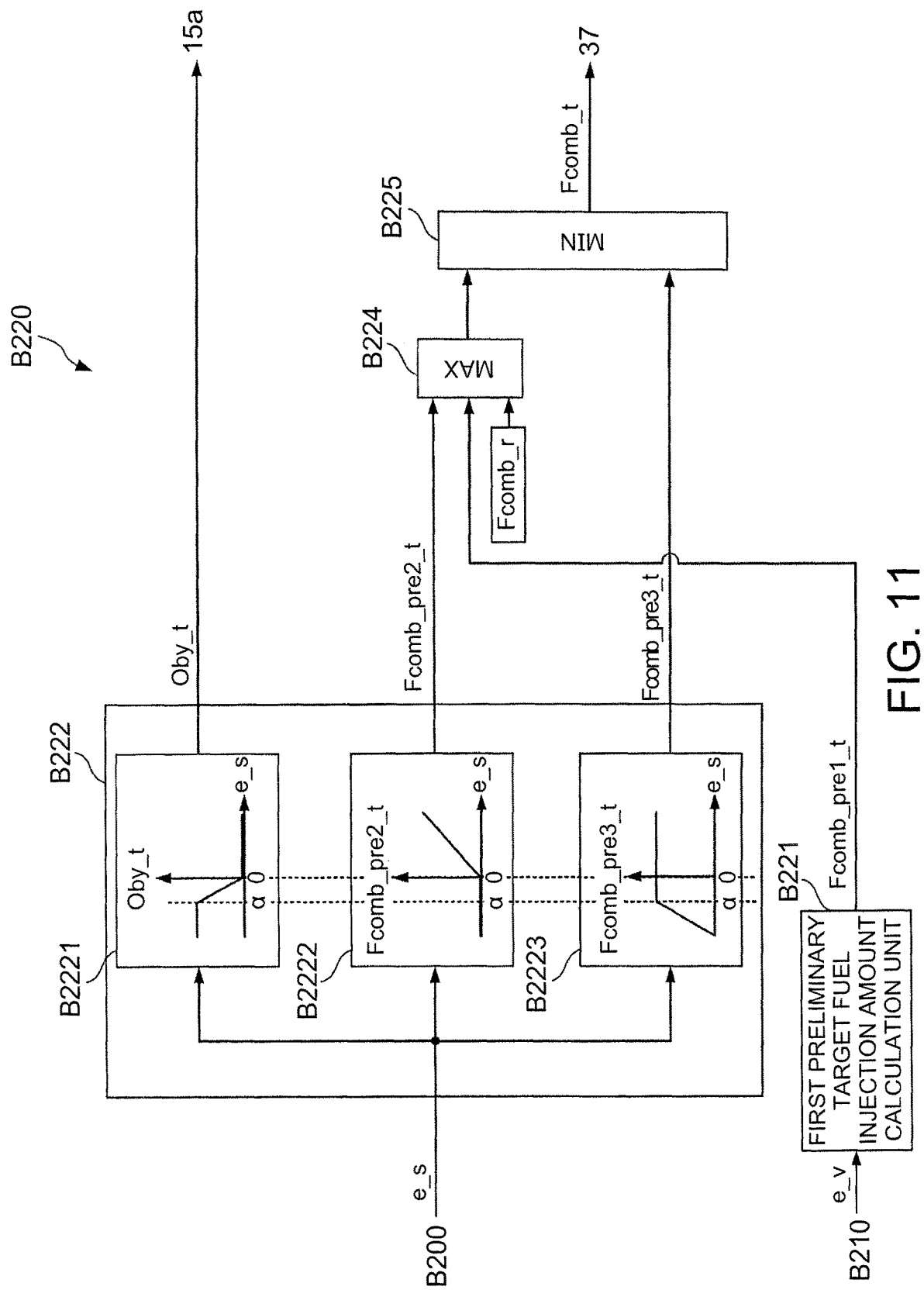
FIG. 11 is a block diagram explaining a variant of the feedback control unit.

For example, instead of the control logics based on the block diagram of FIG. 8 according to the second embodiment and the third embodiment, the control logic based on a block diagram illustrated in FIG. may be employed. Specifically, in FIG. 11, in addition to the configuration of the block diagram of FIG. 8, a reformer required fuel injection amount Fcomb_r being a fuel injection amount, required by the reformer 16, that is determined according to the warm-up degree of the reformer 16 in the warm-up operation based on the reformer temperature Tr being the temperature of the reformer 16 (see FIG. 1) in the warm-up operation is input to the maximum selection unit B224.

Consequently, the maximum value, among the first tentative target fuel injection amount Fcomb_pre1_t that is determined in terms of the warm-up of the evaporator 32, the second tentative target fuel injection amount Fcomb_pre2_t that is determined in terms of the warm-up of the fuel cell stack 10, and the reformer required fuel injection amount Fcomb_r, from the maximum selection unit B224 is used for adjustment of the fuel injection amount Fcomb through the process of the minimum selection unit B225. That is, it is possible to adjust the fuel injection amount Fcomb based on the warm-up degree of the fuel cell stack 10, the warm-up degree of the reformer 16, and the warm-up degree of the evaporator 32.

Figure 12:
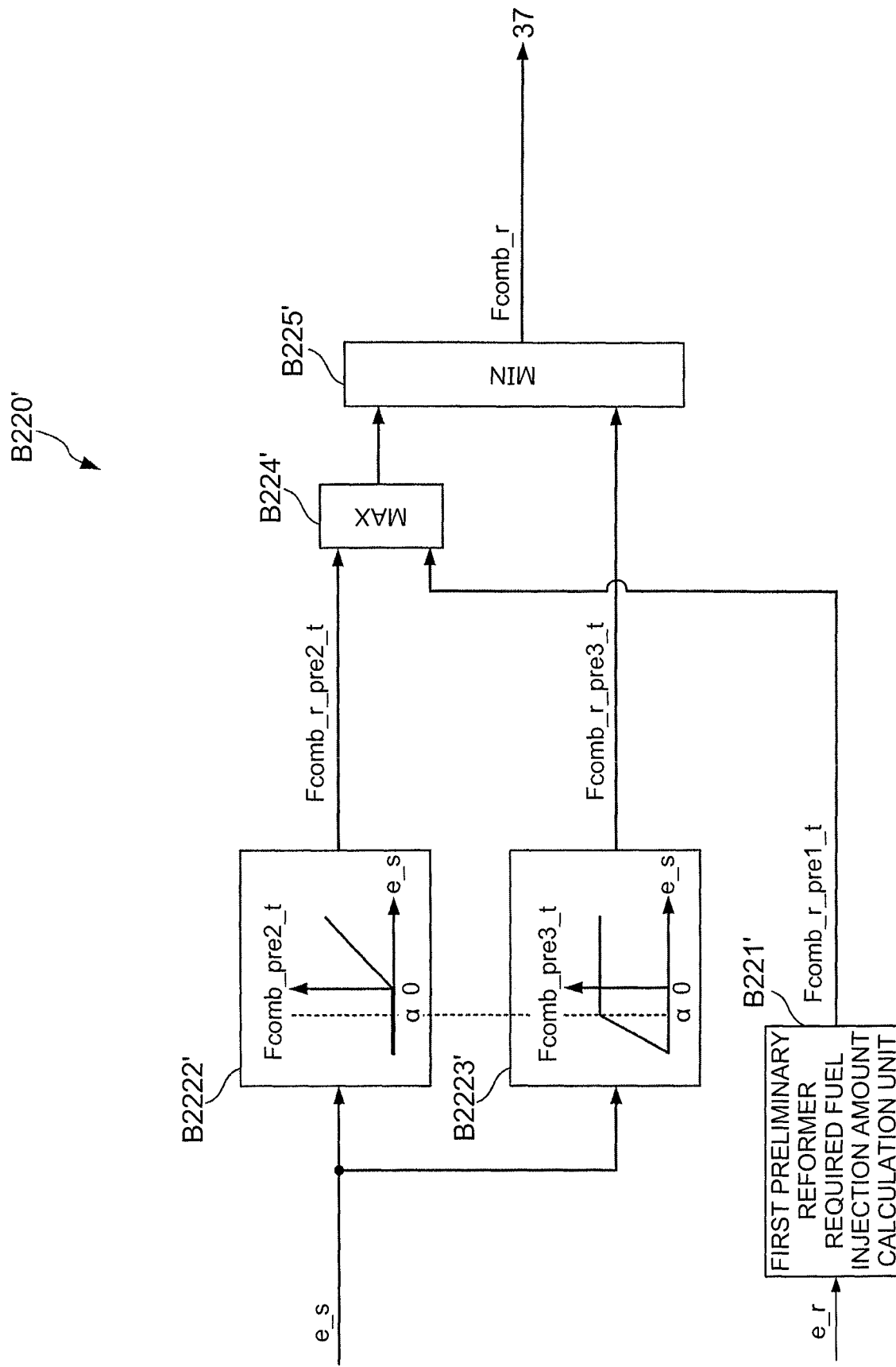
FIG. 12 is a block diagram explaining one example of a calculation logic of a reformer required fuel injection amount.

Further, for example, according to the control logic illustrated in FIG. 12, the reformer required fuel injection amount Fcomb_r may be calculated based on a reformer temperature deviation e_r (=reformer warm-up target temperature Tr_t−reformer temperature Tr).

In FIG. 12, a first tentative reformer required fuel injection amount calculation unit B221' calculates a first tentative reformer required fuel injection amount Fcomb_r_pre1_t based on the reformer temperature deviation e_r (so that the reformer temperature deviation e_r approaches zero). Further, a second tentative reformer required fuel injection amount calculation unit B2222' calculates a second tentative reformer required fuel injection amount Fcomb_r_pre2_t based on the reformer temperature deviation e_r according to a predetermined map illustrated in the figure. Further, a third tentative reformer required fuel injection amount calculation unit B2223' calculates a third tentative reformer required fuel injection amount Fcomb_r_pre3_t based on the reformer temperature deviation e_r according to a predetermined map illustrated in the figure.

A maximum selection unit B224' selects a greater value between the first tentative reformer required fuel injection amount Fcomb_r_pre1_t and the second tentative reformer required fuel injection amount Fcomb_r_pre2_t. Then, a minimum selection unit B225' sets, as the reformer required fuel injection amount Fcomb_r, a smaller value between the selected value and the third tentative reformer required fuel injection amount Fcomb_r_pre3_t. The reformer required fuel injection amount Fcomb_r thus determined is input to the maximum selection unit B224 illustrated in FIG. 11. Consequently, it is possible to properly adjust the mutual progress balance of the warm-up of the fuel cell stack 10, the warm-up of the reformer 16, and the warm-up of the evaporator 32 in the warm-up operation.

In this case, when at least one of the first tentative reformer required fuel injection amount calculation unit B221' and the second tentative reformer required fuel injection amount calculation unit B2222' performs calculation by feedback control including an integral action, it is conceivable that, like in the case described in the second embodiment, an integral term is increased due to the repetition of calculation of the value not selected in the maximum selection unit B224', thereby causing a control error such as overshoot or hunting. Therefore, in order to suppress this, like in the second embodiment, it is preferable to stop the integral action in the calculation of the value not selected.

The invention claimed is:
1. A fuel cell system comprising:
a fuel cell configured to be supplied with fuel and air to generate electricity;
an evaporator configured to evaporate the fuel to be supplied to the fuel cell;
an off-gas heating device configured to heat an off-gas discharged from the fuel cell to produce a heating gas;
a fuel cell heating device configured to heat the air to be supplied to the fuel cell using the heating gas;
an evaporator heating device configured to heat the evaporator by the heating gas;
a fuel cell temperature acquisition unit configured to acquire a temperature of the fuel cell;
an evaporator temperature acquisition unit configured to acquire a temperature of the evaporator; and a controller configured to, in a warm-up operation to perform a warm-up of the evaporator and a warm-up of the fuel cell, control at least one of the evaporator heating device and the fuel cell heating device based on the temperature of the evaporator and the temperature of the fuel cell to adjust at least one of a heating amount of the evaporator and a heating amount of the air by the heating gas, wherein the controller is configured to reduce the heating amount of the air by the heating gas when a warm-up degree based on the temperature of the fuel cell is greater than a warm-up degree based on the temperature of the evaporator.

2. A fuel cell system comprising:

a fuel cell configured to be supplied with fuel and air to generate electricity;

an evaporator configured to evaporate the fuel to be supplied to the fuel cell;

an off-gas heating device configured to heat an off-gas discharged from the fuel cell to produce a heating gas;

a fuel cell heating device configured to heat the air to be supplied to the fuel cell using the heating gas;

an evaporator heating device configured to heat the evaporator by the heating gas;

a fuel cell temperature acquisition unit configured to acquire a temperature of the fuel cell;

an evaporator temperature acquisition unit configured to acquire a temperature of the evaporator; and a controller configured to, in a warm-up operation to perform a warm-up of the evaporator and a warm-up of the fuel cell, control at least one of the evaporator heating device and the fuel cell heating device based on the temperature of the evaporator and the temperature of the fuel cell to adjust at least one of a heating amount of the evaporator and a heating amount of the air by the heating gas, wherein the controller is configured to increase a heating amount of the off-gas when a warm-up degree based on the temperature of the evaporator is greater than a warm-up degree based on the temperature of the fuel cell.

3. The fuel cell system according to claim 1, wherein:

the fuel cell heating device includes an air heat exchanger provided to an air supply passage configured to supply the air to the fuel cell, the air heat exchanger configured to perform heat exchange of the air in the air supply passage with the heating gas, a bypass passage provided to the air supply passage to bypass the air heat exchanger, and a bypass valve provided in the bypass passage;

the evaporator heating device includes the bypass valve and an after-fuel-cell-heating gas supply system configured to supply an after-fuel-cell-heating gas to the evaporator, the after-fuel-cell-heating gas being the heating gas after being used for the heat exchange in the air heat exchanger; and the controller is configured to control an opening degree of the bypass valve to adjust an air flow rate to be supplied to the air heat exchanger.

4. The fuel cell system according to claim 3, wherein at least one of the bypass valve and the bypass passage is configured to, even when the bypass valve is in a fully open state, provide a bypass air flow rate that prevents the temperature of the evaporator from exceeding a predetermined upper limit temperature.

5. The fuel cell system according to claim 1, wherein:

the off-gas heating device includes a discharged gas combustor configured to produce a combustion gas as the heating gas by burning the off-gas, and a fuel supply amount adjustment unit configured to adjust an amount of the fuel to be supplied to the discharged gas combustor; and the controller is configured to control the fuel supply amount adjustment unit to adjust a fuel supply amount to the discharged gas combustor.

6. The fuel cell system according to claim 5, further comprising:

a raw fuel tank storing raw fuel;

a combustor fuel supply passage configured to supply the fuel from the raw fuel tank to the discharged gas combustor;

a combustion gas supply passage configured to supply the combustion gas produced in the discharged gas combustor to the fuel cell heating device; and an evaporator gas supply passage configured to supply an after-fuel-cell-heating combustion gas to the evaporator heating device, the after-fuel-cell-heating combustion gas being the combustion gas after being used for heating the fuel cell in the fuel cell heating device, wherein:

the fuel supply amount adjustment unit includes an injector provided in the combustor fuel supply passage; and the controller is configured to control the injector to adjust the fuel supply amount to the discharged gas combustor.

7. The fuel cell system according to claim 1, wherein the controller is configured to reduce the heating amount of the air by the heating gas when the warm-up of the fuel cell is completed earlier than the warm-up of the evaporator.

8. The fuel cell system according to claim 7, wherein the controller is configured to reduce the heating amount of the air by the heating gas when an evaporator warm-up completion predicted time being a predicted time at which the warm-up of the evaporator is completed exceeds a fuel cell warm-up completion predicted time being a predicted time at which the warm-up of the fuel cell is completed.

9. The fuel cell system according to claim 1, wherein the controller is configured to limit an increase of the heating amount of the off-gas when an amount of the air for heat exchange with the heating gas has reached a predetermined lower limit value.

10. The fuel cell system according to claim 1, wherein:

the warm-up degree of the fuel cell is a ratio of the temperature of the fuel cell acquired to a warm-up target temperature of the fuel cell; and the warm-up degree of the evaporator is a ratio of the temperature of the evaporator acquired to a warm-up target temperature of the evaporator.

11. The fuel cell system according to claim 10, wherein the controller is configured to:

as the ratio of the temperature of the evaporator acquired to the warm-up target temperature of the evaporator, set an evaporator temperature deviation obtained by subtracting the temperature of the evaporator from the warm-up target temperature of the evaporator;

as the ratio of the temperature of the fuel cell acquired to the warm-up target temperature of the fuel cell, set a fuel cell temperature deviation obtained by subtracting the temperature of the fuel cell from the warm-up target temperature of the fuel cell;

based on the evaporator temperature deviation, calculate an evaporator required off-gas heating amount being a heating amount of the off-gas required by the evaporator;

based on the fuel cell temperature deviation, calculate a fuel cell required off-gas heating amount being a heating amount of the off-gas required by the fuel cell;

set an off-gas heating amount target value being a target value of the heating amount of the off-gas based on the evaporator required off-gas heating amount and the fuel cell required off-gas heating amount; and control the off-gas heating device based on the off-gas heating amount target value.

12. The fuel cell system according to claim 11, wherein the controller is configured to set the off-gas heating amount target value by selecting a greater value between the evaporator required off-gas heating amount and the fuel cell required off-gas heating amount.

13. The fuel cell system according to claim 12, wherein the controller is configured to:

perform at least one of calculation of the evaporator required off-gas heating amount and calculation of the fuel cell required off-gas heating amount by feedback control including an integral action; and stop the integral action when the calculation of the value not selected in setting the off-gas heating amount target value is performed by the feedback control including the integral action.

14. The fuel cell system according to claim 11, wherein the controller is configured to:

based on the fuel cell temperature deviation, set an air heating amount target value being a target value of the heating amount of the air by the heating gas required by the fuel cell; and control the fuel cell heating device based on the air heating amount target value.

15. The fuel cell system according to claim 1, wherein the fuel cell temperature acquisition unit is configured to acquire at least one of a temperature of the air that is supplied to the fuel cell, a temperature of the off-gas that is discharged from the fuel cell, and an average value of these temperatures.

16. The fuel cell system according to claim 1, wherein the evaporator temperature acquisition unit is configured to acquire a temperature of the heating gas after being used for heating the evaporator.

17. A method for warming up a fuel cell system, the method comprising:

producing a heating gas by heating an off-gas discharged from a fuel cell configured to be supplied with fuel and air to generate electricity; and using the heating gas, produced, to heat the air to be supplied to the fuel cell and to heat an evaporator configured to evaporate the fuel to be supplied to the fuel cell, wherein:

at least one of a heating amount of the off-gas and a heating amount of the air by the heating gas is adjusted based on a temperature of the fuel cell and a temperature of the evaporator; and the heating amount of the air by the heating gas is reduced when a warm-up degree based on the temperature of the fuel cell is greater than a warm-up degree based on the temperature of the evaporator.

18. A method for warming up a fuel cell system, the method comprising:

producing a heating gas by heating an off-gas discharged from a fuel cell configured to be supplied with fuel and air to generate electricity; and using the heating gas, produced, to heat the air to be supplied to the fuel cell and to heat an evaporator configured to evaporate the fuel to be supplied to the fuel cell, wherein:

at least one of a heating amount of the off-gas and a heating amount of the air by the heating gas is adjusted based on a temperature of the fuel cell and a temperature of the evaporator; and the heating amount of the off-gas is increased when a warm-up degree based on the temperature of the evaporator is greater than a warm-up degree based on the temperature of the fuel cell.

* * * * *